(12) United States Patent
Chebaro

(10) Patent No.: US 10,771,250 B2
(45) Date of Patent: *Sep. 8, 2020

(54) DISTRIBUTED TOKEN-LESS AUTHENTICATION

(71) Applicant: Toufic Chebaro, Beirut (LB)

(72) Inventor: Toufic Chebaro, Beirut (LB)

( * ) Notice: Subject to any disclaimer, the term of this patent is extended or adjusted under 35 U.S.C. 154(b) by 211 days.

This patent is subject to a terminal disclaimer.

(21) Appl. No.: 16/058,333

(22) Filed: Aug. 8, 2018

(65) Prior Publication Data

US 2019/0349197 A1 Nov. 14, 2019

Related U.S. Application Data

(63) Continuation of application No. 15/978,052, filed on May 11, 2018, now Pat. No. 10,079,683.

(51) Int. Cl.
*H04L 9/32* (2006.01)
*H04L 29/06* (2006.01)
(Continued)

(52) U.S. Cl.
CPC ........ *H04L 9/3226* (2013.01); *G06K 9/00006* (2013.01); *G06Q 20/4012* (2013.01); *G06Q 20/40145* (2013.01); *G07F 7/1091* (2013.01); *H04L 9/0866* (2013.01); *H04L 9/3236* (2013.01); *H04L 9/3271* (2013.01); *H04L 63/06* (2013.01); *H04L 63/083* (2013.01); *H04L 63/18* (2013.01); *H04W 12/00503* (2019.01)

(58) Field of Classification Search
None
See application file for complete search history.

(56) References Cited

U.S. PATENT DOCUMENTS

| 2002/0120760 A1* | 8/2002 | Kimchi | H04L 29/06027 709/230 |
| 2003/0105725 A1* | 6/2003 | Hoffman | G06F 21/83 705/75 |

(Continued)

OTHER PUBLICATIONS

Abdurrahman et al. "A new mobile-based multi-factor authentication scheme using pre-shared number, GPS location and time stamp," 2013 International Conference on Electronics, Computer and Computation (ICECCO), IEEE, Nov. 7, 2013, pp. 293-296, XP032553531, 4 pages.

(Continued)

*Primary Examiner* — Fatoumata Traore
(74) *Attorney, Agent, or Firm* — Procopio, Cory, Hargreaves & Savitch LLP

(57) ABSTRACT

Distributed token-less authentication. In an embodiment, a partially-hashed personal identification number (PIN) is received from a terminal via at least one first network, wherein the partially-hashed PIN comprises an unhashed first portion that identifies a service-specific interface associated with the user account, and a hashed second portion. The partially-hashed PIN is relayed to the service-specific interface, identified by the first unhashed portion of the partially-hashed PIN, via at least one second network. Subsequently, a first-level confirmation or rejection is received from the service-specific interface via the at least one second network, and the first-level confirmation or rejection is relayed to the terminal via the at least one first network.

12 Claims, 8 Drawing Sheets

(51) Int. Cl.
*G06Q 20/40* (2012.01)
*G06K 9/00* (2006.01)
*H04L 9/08* (2006.01)
*G07F 7/10* (2006.01)
*H04W 12/00* (2009.01)

(56) References Cited

U.S. PATENT DOCUMENTS

| | | | | |
|---|---|---|---|---|
| 2005/0036611 A1* | 2/2005 | Seaton, Jr. | ............ | G07F 7/1025 |
| | | | | 380/44 |
| 2010/0299267 A1* | 11/2010 | Faith | ............ | G06Q 40/02 |
| | | | | 705/76 |
| 2012/0039469 A1* | 2/2012 | Mueller | ............ | G06Q 20/12 |
| | | | | 380/252 |

OTHER PUBLICATIONS

Berbecaru "LRAP: A Location-Based Remote Client Authentication Protocol for Mobile Environments," 2011 19th International Euromicro Conference on Parallel, Distributed and Network-Based Processing (PDP), IEEE, Feb. 9, 2011, pp. 141-145, XP031332803, 5 pages.
International Search Report for International Patent Application No. PCT/IB2019/052137, dated Jun. 26, 2019, 4 pages.
Written Opinion for International Patent Application No. PCT/IB2019/052137, dated Jun. 26, 2019, 9 pages.

* cited by examiner

530D

DISTRIBUTED TOKEN-LESS AUTHENTICATION

CROSS-REFERENCE TO RELATED APPLICATIONS

This application is a continuation of U.S. patent application Ser. No. 15/978,052, filed on May 11, 2018—the entirety of which is hereby incorporated herein by reference, as if set forth in full.

BACKGROUND

Field of the Invention

The embodiments described herein are generally directed to authentication, and, more particularly, to distributed, secure, token-less authentication.

Description of the Related Art

Conventional authentication mechanisms generally require man-made tokens (e.g., cards, passports, documents, etc.) to prove the identity of a user of a terminal (e.g., a point-of-service terminal, Automated Teller Machine (ATM), security check point, airport check-in counter, etc.) for conducting a transaction (e.g., financial transaction, such as a purchase of a service or good, withdrawal of funds from a bank account, determining an amount of funds available in the bank account, etc., general security transactions, such as a check-in transaction for an airline, etc.). However, such tokens may be lost, stolen, fraudulently reproduced, and/or the like. They may also be cumbersome to carry and expensive to create, thereby imposing additional burdens on the user.

Therefore, it would be desirable to have a token-less authentication mechanism to verify the identities of users prior to providing those users with access to any variety of services. However, such mechanisms are associated with higher risks. For example, biometric-related technologies may compromise users' confidentiality and security, especially when the biometric data for such technologies are communicated over the Internet. In such a case, the biometric data may be stolen and used to conduct fraudulent transactions.

Accordingly, what is needed is a token-less authentication mechanism that benefits from the advances in biometric and Internet technologies, but without the aforementioned confidentiality and security issues, and which allows scalability at a global level.

SUMMARY

Accordingly, a token-less authentication method is disclosed. In an embodiment, the method comprises, by at least one hardware processor of a region-specific interface: via at least one first network, receiving a partially-hashed personal identification number (PIN) from a terminal, wherein the partially-hashed PIN comprises an unhashed first portion that identifies a service-specific interface associated with the user account, and a hashed second portion; via at least one second network, relaying the partially-hashed PIN to the service-specific interface identified by the unhashed first portion of the partially-hashed PIN; via the at least one second network, receiving a first-level confirmation or rejection from the service-specific interface; and, via the at least one first network, relaying the first-level confirmation or rejection to the terminal. The method may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for a token-less authentication mechanism. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Infrastructure

Figure 1:
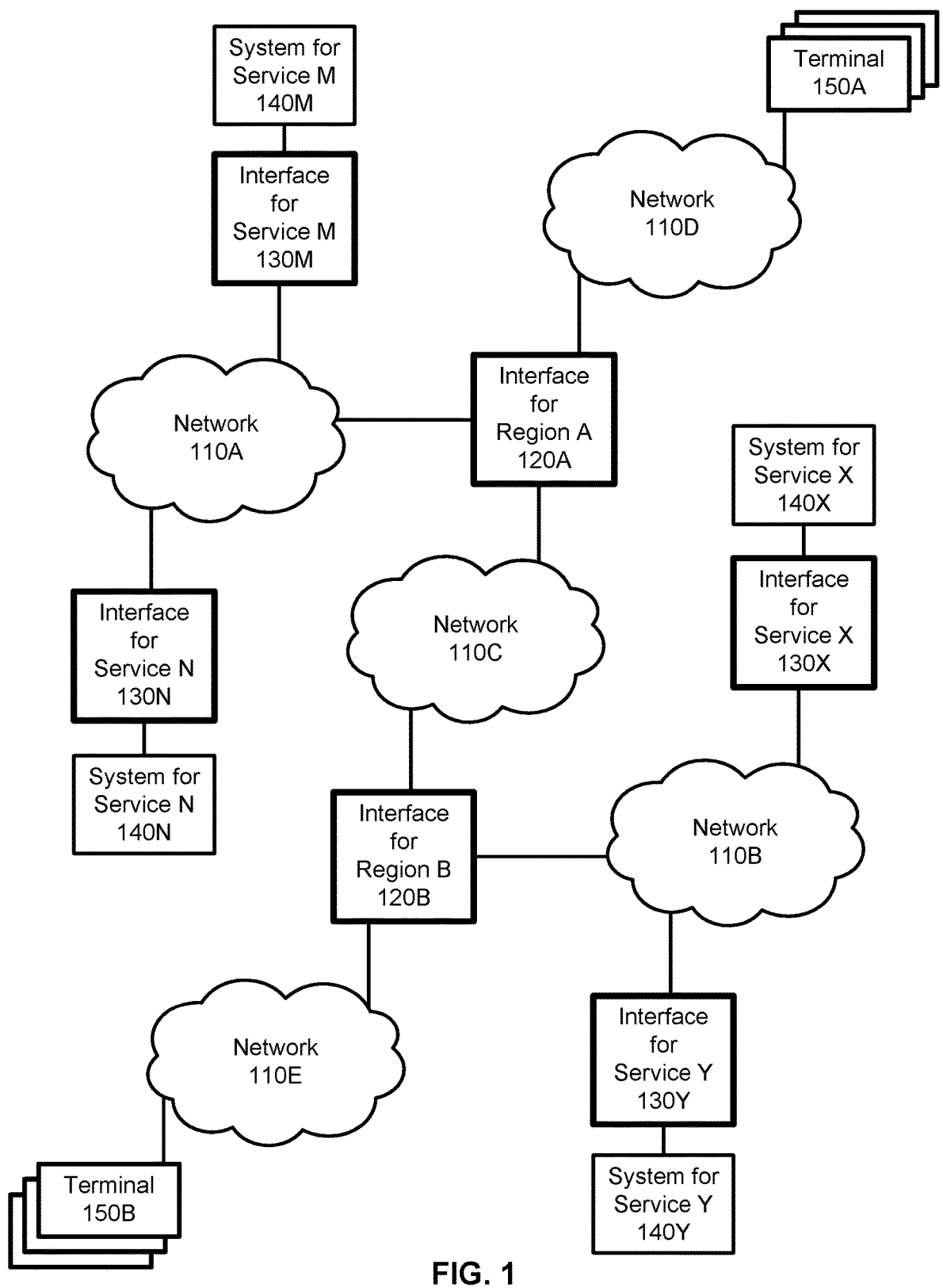
FIG. 1 illustrates an example system for token-less authentication, in which one or more of the processes described herein, may be implemented, according to an embodiment.

FIG. 1 illustrates an example system for token-less authentication, within an operating environment, according to an embodiment. The system may comprise any number of distributed region-specific interfaces 120 and service-specific interfaces 130, communicatively connected to each other via one or more networks 110. For example, an interface 120A for a Region A may be communicatively connected to an interface 120B for a Region B via a network 110C, and communicatively connected to an interface 130M for a Service M and an interface 130N for a Service N via a network 110A. Similarly, interface 120B for Region B may be communicatively connected to interface 120A for Region A via network 110C, and communicatively connected to an interface 130X for a Service X and an interface 130Y for a Service Y. While FIG. 1 only illustrates two regions and two services per region, the system may comprise any number of interfaces 120 for any number of regions and any number of interfaces 130 for any number of services per region, including different numbers of services in different regions. Each region may correspond to a different geographical area, such as a country (e.g., the United States of America) or continent (e.g., Asia), a jurisdictional area (e.g., European Union), and/or the like. Each service may be provided by an entity, such as a corporation, partnership, and/or the like. For ease of understanding, in the examples described herein, each region may be assumed to be a distinct country, and each service may be assumed to be a distinct financial service provided by a financial institution (e.g., a bank).

As illustrated, each region-specific interface 120 may be communicatively connected to one or more service-specific interfaces 130, which may each, in turn, be communicatively connected to a service-specific system 140. For example, interface 130M for Service M is communicatively connected to system 140M for Service M, interface 130N for Service N is communicatively connected to system 140N for Service N, interface 130X for Service X is communicatively connected to system 140X for Service X, and interface 130Y for Service Y is communicatively connected to system 140Y for Service Y. In other words, each region-specific interface 120 provides a communication interface to one or more service-specific interfaces 130, and each service-specific interface 130 provides a communication interface to a system 140 by which an entity provides a particular service. In the case that an entity is a bank, the corresponding service-specific system 140 may comprise the bank's system for conducting financial transactions.

The system may also comprise one or more terminals 150 within one or more of the regions. For example, terminal(s) 150A, located in Region A, may be communicatively connected to interface 120A for Region A, via network 110D. Similarly, terminal(s) 150B, located in Region B, may be communicatively connected to interface 120B for Region B, via network 110E. Each terminal 150 may be configured to conduct a transaction, such as a financial transaction, general security transaction (e.g., airline check-in), and/or the like. For example, a terminal 150 may be a point-of-sale (POS) terminal within a brick-and-mortar store located within the corresponding region, through which a purchase can be consummated. As another example, a terminal 150 may be an ATM, located within the corresponding region, through which a withdrawal of cash, a deposit of cash and/or checks, a check of available funds, and/or the like can be performed. As yet another example, a terminal 150 may be a user's mobile device (e.g., a smart phone, tablet computer, etc.) or desktop computer. Terminals 150 within a particular region may comprise different types and mixtures of terminals (e.g., different types of POS terminals, different types of ATM terminals, and/or different types of mobile devices) or consist of a uniform type of terminals.

Each interface 120 and 130 may be implemented by a server application executing on a server (e.g., located within the corresponding region). In this case, one or more servers may be used to implement each interface 120 and 130, including separate servers for each interface 120 and 130. Regardless of the number of servers used to implement interfaces 120 and 130, the server(s) may comprise dedicated server(s), and/or cloud instance(s) which utilize shared resources of one or more servers. These server(s) or cloud instance(s) may be collocated and/or geographically distributed.

Each interface 120 and 130 may provide an application programming interface (API), which defines the manner in which other systems may interact with the implementing server application. For instance, each API may provide a set of subroutine definitions, protocols, and/or tools to be utilized by other systems (e.g., terminal(s) 150), in order to access or otherwise utilize the functions of each server application. Similarly, each interface 120 and 130 may utilize the API of another interface 120 or 130 and/or system 140 in order to access or otherwise utilize functions of that other interface and/or system. For example, interface 130M may utilize one or more subroutines of the API of system 140M to initiate or consummate a transaction (e.g., a withdrawal of funds from a financial account, managed by a bank providing Service M, on behalf of a user of terminal 150A).

While networks 110A-110E are separately depicted, networks 110A-110E may all be a single network. Alternatively, network(s) 110 may comprise any combination of separate networks. In any case, network(s) 110 may comprise the Internet, and one or more of interfaces 120 and/or 130 may communicate through the Internet using standard transmission protocols, such as HyperText Transfer Protocol (HTTP), Secure HTTP (HTTPS), File Transfer Protocol (FTP), FTP Secure (FTPS), Secure Shell (SSH) FTP (SFTP), and the like, as well as proprietary protocols. In an embodiment, network 110A comprises a data network for Region A, network 110B comprises a data network for Region B, network 110C comprises a tier-one global data network, and networks 110D and 110E comprise the Internet.

In an embodiment, interface(s) 120 and/or 130 may comprise web servers which host one or more websites and/or web services. In embodiments in which a website is provided, the website may comprise one or more graphical user interfaces, including, for example, webpages generated in HyperText Markup Language (HTML) or other language. Each interface may transmit or serve screens of the graphical user interface in response to requests from terminal(s) 150. In some embodiments, these screens may be served in the form of a wizard, in which case two or more screens may be served in a sequential manner, and one or more of the sequential screens may depend on an interaction of the user or user system with one or more preceding screens. The requests to the interface(s) and the responses from the interface(s), including the screens of the graphical user interfaces, may both be communicated through network(s) 110, which may include the Internet, using standard communication protocols (e.g., HTTP, HTTPS, etc.). These user interfaces or web pages may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases that are locally and/or remotely accessible to the interface(s). The interface(s) may also respond to other types of requests from terminal(s) 150.

Interface(s) 120 and/or 130 may further comprise, be communicatively coupled with, or otherwise have access to one or more databases. For example, one or more interfaces 120 and/or 130 may comprise one or more database servers which manage one or more databases. A terminal 150 or server application, executing on an interface 120 or 130, may submit data (e.g., user data, form data, etc.) to be stored in the database(s), and/or request access to data stored in the database(s). Any suitable database may be utilized, including without limitation MySQL™, Oracle™, IBM™, Microsoft SQL™, Sybase™, Access™, and the like, including cloud-based database instances and proprietary databases. Data may be sent to interface(s) 120 and/or 130, for instance, using the well-known POST request supported by HTTP, via FTP, and/or the like This data, as well as other requests, may be handled, for example, by server-side web technology, such as a servlet or other software module, implemented by interface(s) 120 and/or 130.

In embodiments in which a web service is provided, interface(s) 120 and/or 130 may receive requests from external system(s) (e.g., terminal(s) 150), and provide responses in JavaScript Object Notation (JSON), eXtensible Markup Language (XML), and/or any other suitable or desired format. In such embodiments, the API of the interface(s) may define the manner in which terminal(s) 150 and/or other external systems interact with the web service. Thus, these terminal(s) 150 and/or other external systems (which may be servers and/or user systems), can define their own user interfaces, and rely on the web service to implement or otherwise provide the backend processes, methods, functionality, storage, and/or the like, described herein. For example, in such an embodiment, a client application executing on one or more terminal(s) 150 and/or other user system(s) may interact with a server application executing on the interface(s) to execute one or more or a portion of one or more of the various functions, processes, methods, and/or software modules described herein. The client application may be "thin," in which case processing is primarily carried out server-side by the server application executing on the interface(s). A basic example of a thin client application is a browser application, which simply requests, receives, and renders webpages client-side, while the server application is responsible for generating the webpages and managing database functions. Alternatively, the client application may be "thick," in which case processing is primarily carried out client-side. It should be understood that the client application may perform an amount of processing, relative to the server application, at any point along this spectrum between "thin" and "thick," depending on the design goals of the particular implementation.

1.2. Example Processing Device

Figure 2:
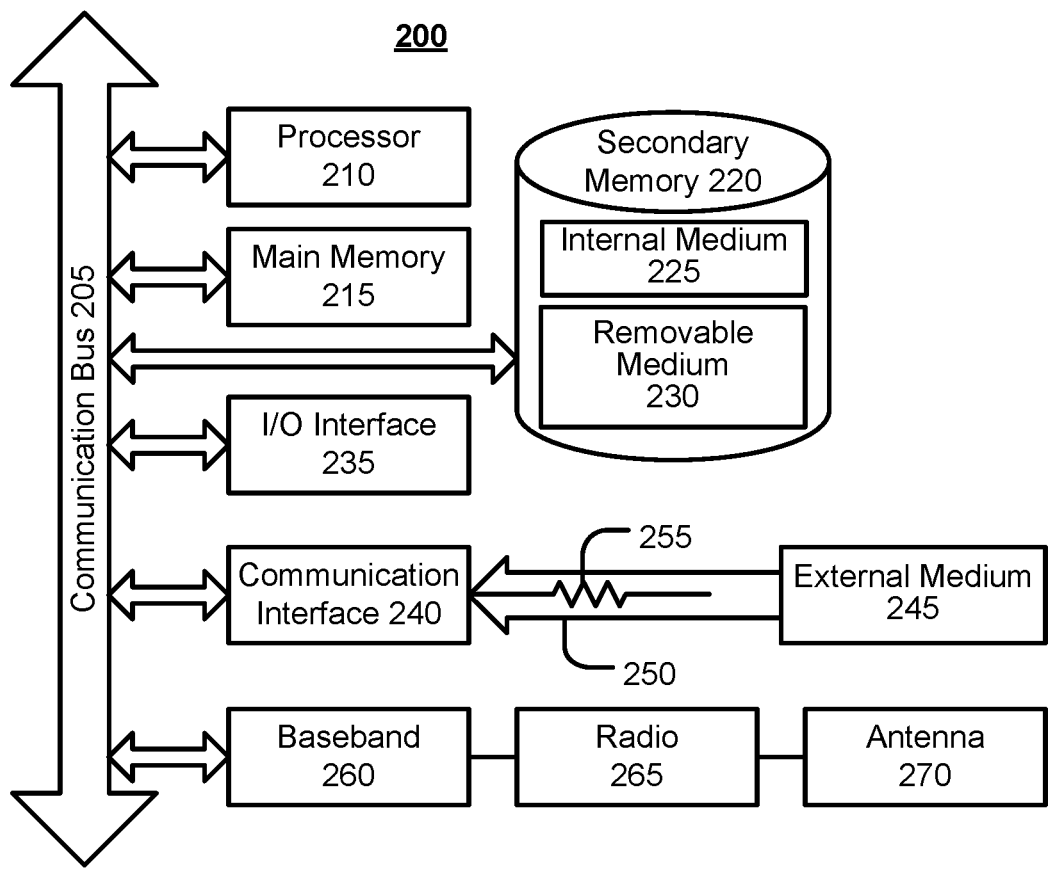
FIG. 2 illustrates an example processing system, by which one or more of the processed described herein, may be executed, according to an embodiment.

FIG. 2 is a block diagram illustrating an example wired or wireless system 200 that may be used in connection with various embodiments described herein. For example, system 200 may be used as or in conjunction with one or more of the mechanisms, processes, methods, or functions (e.g., to store and/or execute one or more software modules) described herein, and may represent components of one or more servers implementing region-specific interface(s) 120 and/or service-specific interface(s) 130, one or more servers implementing system(s) 140, terminal(s) 150, and/or any other processing devices described herein. System 200 can be any processor-enabled device that is capable of wired and/or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 210. Examples of processors which may be used with system 200 include, without limitation, the Pentium® processor, Core i7® processor, and Xeon® processor, and/or any other available processor.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPM), IEEE 696/S-100, and the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal memory 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having stored thereon computer-executable code (e.g., disclosed software modules) and/or data. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, an external storage medium 245 and a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory such as programmable read-only memory (PROM), erasable programmable read-only memory (EPROM), electrically erasable read-only memory (EEPROM), or flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 200 with a network or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs or software modules) is stored in main memory 215 and/or the secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable mediums are means for providing executable code, programming instructions, and software to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, biometric sensing and/or capturing devices, computer mice, trackballs, pen-based signing and/or pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like.

System 200 may also include optional wireless communication components that facilitate wireless communication over a voice network and/or a data network. The wireless communication components comprise an antenna system 270, a radio system 265, and a baseband system 260. In system 200, radio frequency (RF) signals are transmitted and received over the air by antenna system 270 under the management of radio system 265.

In one embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also codes the digital signals for transmission and generates a baseband transmit audio signal that is routed to the modulator portion of radio system 265. The modulator mixes the baseband transmit audio signal with an RF carrier signal generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments. For example, data storage areas 215 or 220 may include various software modules.

1.3. Example Data Structure

In an embodiment, each service-specific interface 130 locally comprises or is communicatively connected to a database of user records. Each record may enable a service-specific interface 130 to map a system-wide user identifier to a particular user account of the service provided by the corresponding service-specific system 140. For example, the user records accessible to service-specific interface 130M for Service M may map each of a plurality of unique user identifiers to an associated user account managed by system 140M for an entity, such as a bank. These unique user identifiers may comprise or consist of an account number assigned to each user.

In an embodiment in which the service is a financial service (e.g., provided by a bank), each user record, maintained by the service-specific interface 130, may comprise one or more of the following fields for each user:

User-Specific Account Number: comprising an account number of the user that is unique with respect to the system.

Service-specific Account Number: comprising an account number of the user that is unique with respect to the service corresponding to the service-specific interface 130. The interface 130 may utilize this service-specific account number to interact with the corresponding service-specific system 140 (e.g., via an API of the service-specific system 140), for example, to access and/or manipulate data (e.g., account balances) of the user maintained by service-specific system 140. The service-specific account number may be validated (e.g., during an enrollment process performed by the user) prior to being stored and/or used. Notably, a single bank account may be utilized by multiple users (e.g., family members). Thus, it is possible that two or more separate user records may comprise the same service-specific account number. However, it should be noted that these separate user records will each comprise different user-specific account numbers in their respective User-Specific Account Number fields.

Hashed PIN(s): comprising a hashed version of at least a portion of one or more PINs assigned to the user. In an embodiment, there may be more than one hashed PIN in a single user record. This would indicate that the user has separate virtual cards associated with the same service-specific account number at the same entity, with each virtual card being linked to a different PIN. In an embodiment, no two user records will ever be associated with the same PIN, but a single user record may be associated with multiple PINs.

Virtual Card Data: comprising a record for each of one or more virtual cards associated with the user. Each virtual card may be issued by an operator of the infrastructure and, by virtue of its presence in the user record, is associated with the service-specific account number in the Service-specific Account Number field of the user record. In addition, each virtual card is associated with one of the hashed PIN(s) in the Hashed PIN(s) field. The user record may define each virtual card by a type of card (e.g., credit, debit, etc.), card number (e.g., similar or identical to a credit-card number or debit-card number), an expiration date (e.g., month and year), and/or a Card Verification Code (CVC), in a similar or identical manner to a physical credit or debit card. Each virtual card will be recognized as a valid method of electronic payment at any of terminals 150 and/or any other electronic payment gateway.

Biometric Encryption Key: comprising one or more encryption keys derived from biometric data (e.g., representing any one or more of a user's fingerprint(s), iris(es), face, hand-written signature, voice, etc.) for the user. However, in an embodiment, for enhanced security, the actual biometric data is not stored or otherwise persistently maintained for the user. This field may comprise a plurality of encryption keys, which are each associated with a different biometric source (e.g., one associated with the user's pointer finger and another associated with the user's thumb, one associated with the user's left iris and one associated with the user's right iris, etc.) from the user.

Auxiliary Non-Sensitive Key Data: comprising auxiliary data to be used with each encryption key, as discussed elsewhere herein.

Stored Message: comprising a message randomly generated for each user. For enhanced security, the message may be randomly renewed after each transaction performed by the user. This field may comprise the message in its native form, or, alternatively, a hash of the message that has been generated using any conventional hash function.

User Image Data: comprising image data (e.g., one or more photographs of the user, such as the user's face, a feature vector derived from photograph(s) of the user's face using facial recognition, etc.) representing the user's physical (e.g., facial) features. The image data may be captured for a user during an enrollment process.

User Answers: comprising user-specified answer(s) to one or more predefined challenge questions. For example, during an enrollment process, the user may be required to select one or more challenge questions and provide personal answer(s) to those challenge questions (e.g., via a graphical user interface). This field may store each of those personal answer(s) in association with an indication of the corresponding challenge question.

Additional User Information: one or more fields comprising other useful user information, such as the user's full name (e.g., first and last names), an email address of the user (e.g., for sending communications to the user, such as receipts in Portable Document Format (PDF) for each transaction performed by the user), other contact information for the user (e.g., telephone number, mailing address, etc.), a summary of the user's transactions (e.g., financial transactions, such as POS purchases, general security transactions, such as a check-in at an airline or other security checkpoint), and/or the like.

Figure 3:
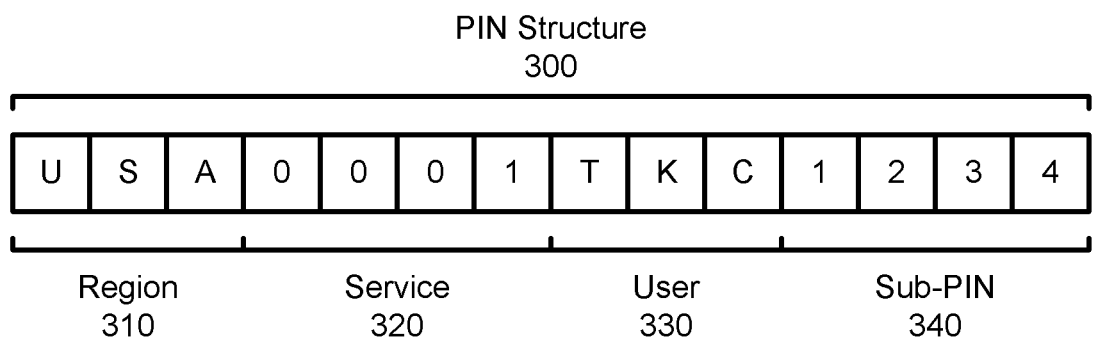
FIG. 3 illustrates an example structure for a personal identification number (PIN), according to an embodiment.

FIG. 3 illustrates an example PIN structure 300, according to an embodiment. Each PIN, represented in the Hashed PIN(s) field, described above, may utilize PIN structure 300. In the illustrated embodiment, PIN structure 300 comprises a region field 310, a service field 320, a user field 330, and a sub-PIN field 340.

Region field 310 may uniquely indicate the region with which the account of the user of the PIN is associated. More specifically, region field 310 may indicate the region-specific interface 120 with which a terminal 150 should communicate to authenticate the user. In an embodiment in which regions correspond to countries, the region field 310 in a given PIN comprises a value representing a country. In this case, the value of region field 310 may be a three-character alphabetic or numeric abbreviation of the user's associated country. Any standard set of country codes may be used for determining the abbreviations for countries, including, without limitation, the International Telecommunication Union (ITU) letter codes for member countries, the International Organization for Standardization (ISO) 3166-1 alpha-2 or alpha-3 codes, the ISO 3166-1 numeric codes, and/or the like. In instances, in which the values of region field 310 may have variable lengths, while the length of region field 310 is static, any value that is shorter than the length of region field 310 may have blank characters (e.g., "0" for numeric values, a space for alphabetic characters, etc.) appended to the start or end of the value to conform the value to the length of region field 310.

Service field 320 may uniquely indicate the service (e.g., provided by a financial entity, such as a bank), with which the account of the user of the PIN is associated, within the region indicated by region field 310. More specifically, service field 320 may indicate the service-specific interface 130 with which the region-specific interface 120 should communicate to authenticate the user. For example, each service-specific interface 130 may be assigned a unique address to be included in service field 320. As illustrated, service field 320 may comprise a value of four numeric characters, thereby enabling the addressing of ten thousand service-specific interfaces 130. Service field 320 may be configured to enable the addressing of more service-specific interfaces 130 by lengthening the field, by allowing alphabetic characters in addition to or instead of numeric characters, and/or the like.

User field 330 may indicate the user of the PIN. As illustrated, user field 330 may comprise three alphabetic characters corresponding to the initials of the user's first, middle, and last names. Notably, in such an embodiment, user field 330 is not necessarily unique, since two users may possess the same initials. In an alternative embodiment, user field 330 may uniquely identify the indicated user (e.g., within the region, specified in region field 310, and for the service, specified in service field 320), for example, using a unique numeric or alphanumeric string.

Sub-PIN field 340 is similar or identical to a conventional PIN, used for conventional card-based payment systems. For example, sub-PIN field 340 may comprise a four to six digit numeric value.

In the illustrated example of FIG. 3, since a user will naturally know the region (e.g., country) of the entity managing his or her account (i.e., represented by region field 310), as well as his or her own initials (i.e., represented by user field 330), the user will only need to recall the service (i.e., represented by service field 320) and his or her sub-PIN (i.e., represented by sub-PIN field 340) when using the PIN, instead of having to remember the entire PIN. Alternatively, if a user is unable to remember the values in region field 310 and/or service field 320 of his or her PIN, terminal 150 may provide this information to the user or otherwise enable the user to easily discover this information. For example, the user may provide basic information, related to the region and/or service, to terminal 150 (e.g., orally in response to a prompt, via text input into a search box or menu, etc.), and, in response, terminal 150 may provide the values to be used for region field 310 and/or service field 320 to the user.

In an embodiment, PIN structure 300 serves dual purposes: (1) it provides an address for establishing end-to-end communications between a terminal 150 and a service-specific interface 130; and (2) it provides a first-level of authentication, in a similar manner as a conventional PIN in a card-based payment system provides a level of authentication. With respect to the former, all of the fields of PIN structure 300 together (e.g., fields 310-340) may represent a unique address to a particular user record at a particular service-specific interface 130. In this case, when the PIN is being set for a particular user for a particular virtual card, the enrollment process may ensure that the PIN does not match a registered PIN for any other user by varying user field 330 and/or sub-PIN field 340. The varying of user field 330 and/or sub-PIN field 340 may be performed automatically without user input (e.g., by selecting the PIN for the user without any user choice), or may be performed semi-automatically with user input (e.g., by prompting a user to select from a subset or range of allowable values for these particular fields that will ensure the uniqueness of the PIN).

PIN structure 300 is merely one example. For instance, each of region field 310, service field 320, user field 330, and sub-PIN field 340 may have a longer or shorter length than the length illustrated in FIG. 3, may have a static or variable length, may allow for numeric, alphabetic, or alphanumeric characters, may be arranged in a different order, and/or the like. In addition, PIN structure 300 may comprise more or fewer fields than those illustrated.

As illustrated, PIN structure 300 may comprise a mixture of one or more fields, which have non-confidential data (e.g., region field 310, service field 320, user field 330), and one or more fields which have confidential data (e.g., sub-PIN field 340). In embodiments in which the PIN is hashed, some implementations may only hash the fields with confidential data. For example, in the illustrated example of FIG. 3, only sub-PIN field 340 may be hashed, and the hashed product of sub-PIN field 340 may be concatenated with region field 310, service field 320, and user field 330, which are not hashed. Alternatively, the entire PIN may be hashed, or any other combination of some subset of the fields with non-confidential data and the fields with confidential data may be hashed.

1.4. Example Terminal

In an embodiment, terminal(s) 150 may comprise one or more POS terminals, which conduct token-less authentication to perform token-less transactions (e.g., the purchase of goods or services). Each POS terminal may comprise a system 200. However, it should be understood that POS terminals, which utilize wired communications and no wireless communications, may omit baseband 260, radio 265, and antenna 270.

One or more POS terminals may be physically located within a brick-and-mortar establishment (e.g., store) of a merchant. For example, a POS terminal may be located at a checkout stand and operated in a similar or identical manner to a conventional checkout register. The POS terminal may be operated by a cashier, employed by the merchant, to conduct transactions (e.g., purchases of goods or services) with customers, or may be a self-service POS terminal which is directly operated by a customer to complete a transaction (e.g., purchase of goods or services).

In an embodiment, each POS terminal is configured to perform token-less transactions using customers' virtual cards. In addition, each POS terminal may also be configured to perform conventional tokened transactions using, for example, cash, physical credit and/or debit cards, devices (e.g., utilizing near-field communications (NFC)), and/or the like. In this case, the POS terminal can be used to conduct both token-less and tokened transactions, so that conventional POS terminals, which are only able to conduct tokened transactions, are unnecessary for accommodating legacy tokened transactions.

In an embodiment, each POS terminal may comprise a processor 210 which executes an application (e.g., stored in main memory 215 and/or secondary memory 220) for performing token-less transactions, including communicating with region-specific interface(s) 120. In embodiments in which the POS terminal also accommodates conventional tokened transactions, the application may also perform the tokened transactions, including communicating with a secure payment gateway (e.g., a region-specific payment gateway for the appropriate region).

Each POS terminal may be linked to a validated bank account, specified by the merchant, to be used for transactions conducted through the POS terminal. For instance, when a purchase is made through a POS terminal of a merchant, the purchase amount may be debited from a bank account of the customer and credited to the bank account specified by the merchant. The merchant may be authenticated for a service-specific system 140 managing the merchant's bank account, in the same manner as any other user described herein.

In an embodiment, terminal(s) 150 may alternatively or additionally comprise one or more ATMs. For instance, a conventional ATM may comprise a system 200 that is modified to store and execute one or more software modules and/or interact with one or more integrated hardware modules that implement the functions of terminal 150 described herein. These embedded modules may implement the various communications (e.g., sending and receiving messages to and from a region-specific interface 120 for the region serviced by the ATM) and other functions described herein. In an embodiment in which the embedded modules are hardware modules, the embedded modules may be connected to a physical interface of the ATM so as to interact with other components of the ATM.

Conventional ATMs generally comprise one or more front-facing cameras. The ATM-embedded modules, implementing the functions described herein, may have direct access to the camera(s) of the ATM or may be configured to receive image data from the camera(s) of the ATM, so as to provide image data from the camera as input to one or more of the functions described herein. Preferably, the camera(s) should be high-definition cameras to produce high-resolution image data that is sufficient for the purposes of facial recognition. In an embodiment in which the embedded modules are hardware modules, the embedded modules may themselves comprise one or more high-definition cameras, instead of or in addition to interfacing with external camera(s).

2. Process Overview

Embodiments of processes for token-less authentication will now be described in detail. It should be understood that the described processes may be embodied in one or more software modules that are executed by one or more hardware processors (e.g., processor 210). The described process may be implemented as instructions represented in source code, object code, and/or machine code. These instructions may be executed directly by the hardware processor(s), or alternatively, may be executed by a virtual machine operating between the object code and the hardware processors.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components.

To clearly illustrate the interchangeability of software and hardware, various illustrative components, blocks, modules, circuits, and steps are described herein generally in terms of their functionality. Whether such functionality is implemented as software or hardware depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention. Furthermore, while each process will be illustrated herein with a specific sequence of steps, it should be understood that, in alternative embodiments, each process may be implemented with more, fewer, or a different arrangement and/or ordering of steps.

2.1. Generation of Biometric Encryption Key

Figure 4A:
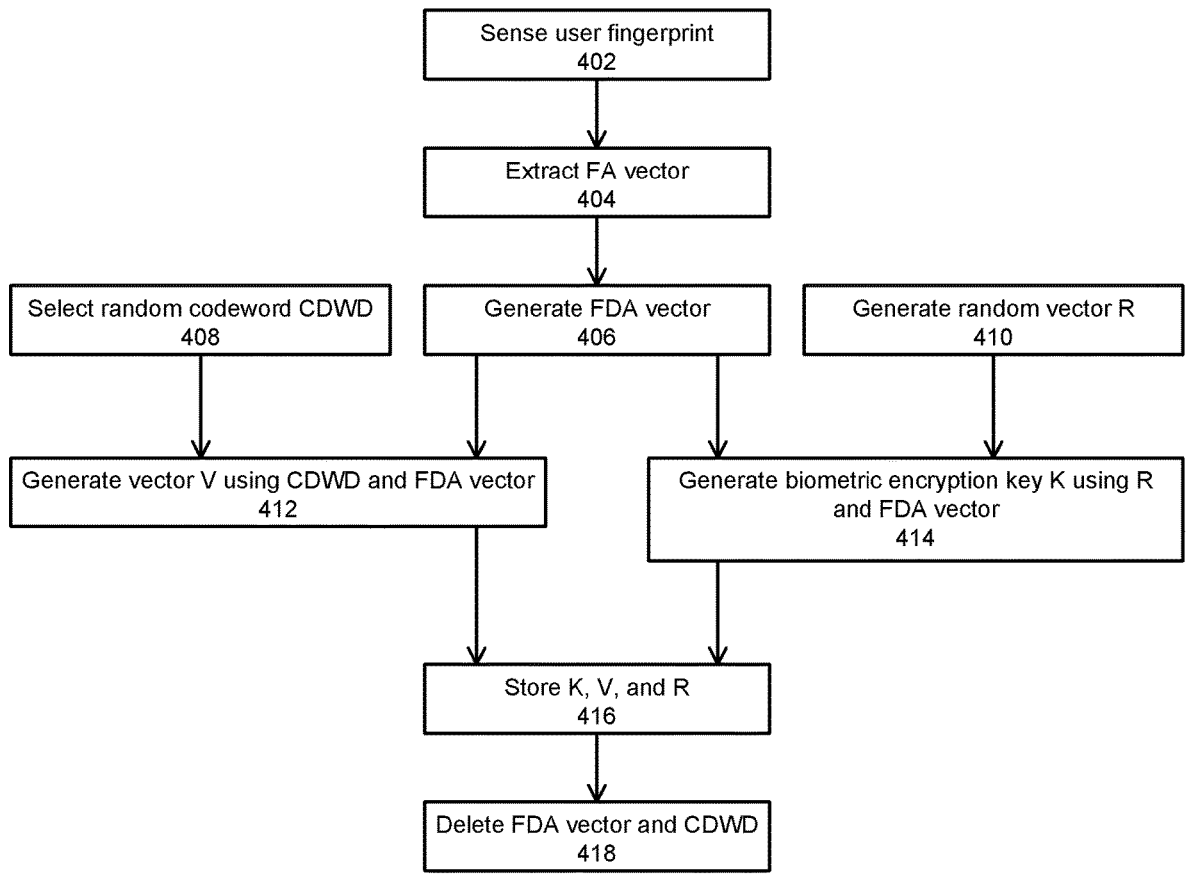
FIG. 4A illustrates a process for generating a biometric encryption key, according to an embodiment.

FIG. 4A illustrates a process 400 for generating a biometric encryption key, according to an embodiment. Process 400 may be performed by software and/or hardware of a service-specific interface 130 and/or other system as part of a user's enrollment process (e.g., when the user is establishing his or her user account with the system). While process 400 will be described with respect to a user's fingerprint, it should be understood that the same process may be applied to other biometric data, such as a user's iris, face, and/or the like.

In step 402, the user's fingerprint is sensed. The fingerprint may be captured using any conventional fingerprint sensor or camera at an enrollment device (e.g., an electronic kiosk at an entity, such as a bank branch) or user device (e.g., via an app executing on the user's smartphone). For example, a given service-specific interface 130 may provide a graphical user interface, via network(s) 110, to the enrollment device (e.g., via a browser or other client application operating on an electronic kiosk, the user's smartphone, or another client device), that prompts the user to provide his or her fingerprint via the fingerprint sensor or camera. The result of step 402 is a representation (e.g., image) of at least one of the user's fingerprints.

In step 404, a multi-dimensional fingerprint attribute (FA) is extracted from each representation of the user's fingerprint. For example, the multi-dimensional FA may comprise a vector whose coordinates are a subset of the first N pseudo-Zernike moments, corresponding to the intensity function associated with an image of the user's fingerprint, of order less than or equal to N and of frequency M. In this case, the result of step 404 is the FA vector representing the multi-dimensional FA.

In step 406, the multi-dimensional FA is digitized into a fingerprint digital attribute (FDA). For example, the coordinates of the FA vector, representing the multi-dimensional FA, may be digitized to generate an FDA vector. In other words, the analog coordinates of the FA vector are converted to digital coordinates in the FDA vector.

The selection of the subset of the first N pseudo-Zernike moments may be based on any relevant statistical criteria, such as the relatively important variance of the selected moments. As an example of this statistical approach, the initial variance of the moments may be estimated based on calculations made on a database of reference fingerprints. This estimation may be continually enhanced as new samples become available (e.g., as new users submit their fingerprints during their enrollment processes). In an embodiment, only the average values over all users is stored, in order to preserve the confidentiality of the users.

If the estimated average value $\overline{X_N}$ and variance value $V_N$, based on N samples of a certain coordinate, are expressed as $$\overline{X_N} = \frac{\sum_{i=1}^{N} X_i}{N}$$

$$V_N = \frac{\sum_{i=1}^{N}(X_i - \overline{X_N})^2}{N},$$

then the updated estimations of the average and variance values of the same coordinate, after the addition of a new sample N+1, can be calculated as follows:

$$\overline{X_{N+1}} = \frac{N\overline{X_N} + X_{N+1}}{N+1}$$

$$V_{N+1} = \frac{N}{N+1}V_N + \frac{(X_{N+1} - \overline{X_N})^2}{N+1} - (\overline{X_{N+1}} - \overline{X_N})^2,$$

wherein $X_{N+1}$ is the value of the new sample N+1.

In step 408, a random code word CDWD is selected, and, in step 410, a random vector R is generated. The code word CDWD may be selected from the code book of a forward error correction (FEC) scheme, such as convolutional codes, turbo codes, and/or the like. Notably, the code word CDWD should have the same dimension as the FDA vector generated in step 406.

In step 412, a vector V is generated using the code word CDWD, selected in step 408, and the FDA vector, generated in step 406. For example, the code word CDWD may be added to the FDA vector, using modulo-2 addition, to obtain vector V.

In step 414, the biometric encryption key K is generated using the random vector R, generated in step 410, and the FDA vector, generated in step 406. Step 414 may utilize any conventional means for generating a key using two vectors to obtain the biometric encryption key K.

In step 416, the biometric encryption key K, generated in step 414, is stored in association with the vector V, generated in step 412, and the random vector R, generated in step 410. For security reasons, in an embodiment, biometric encryption key K will never be sent over a network (e.g., network 110). Vector V and random vector R represent the auxiliary data (V, R), described throughout the present disclosure, and may be sent over a network (e.g., network 110) during an authentication process. Notably, even if (V, R) are intercepted during transmission over network 110, this auxiliary data alone cannot be used to calculate biometric encryption key K or the FDA vector. The auxiliary data (V, R) may be stored for the user (e.g., at the appropriate service-specific interface 130), for example, in the Auxiliary Non-Sensitive Key Data field of the user's record described elsewhere herein.

In step 418, the FDA vector, generated in step 406, and code word CDWD, selected in step 408, are permanently deleted. Since code word CDWD is deleted, the FDA vector cannot be reverse-engineered using stored vector V. This preserves the confidentiality of the user, whose fingerprint(s) are represented by the FDA vector, even within the records of the system's operator.

It should be understood that the particular order of steps 406-410 are not important. Similarly, the particular order of steps 412 and 414, and the particular order of steps 416 and 418 are also not important.

2.2. Regeneration of Biometric Encryption Key

Figure 4B:
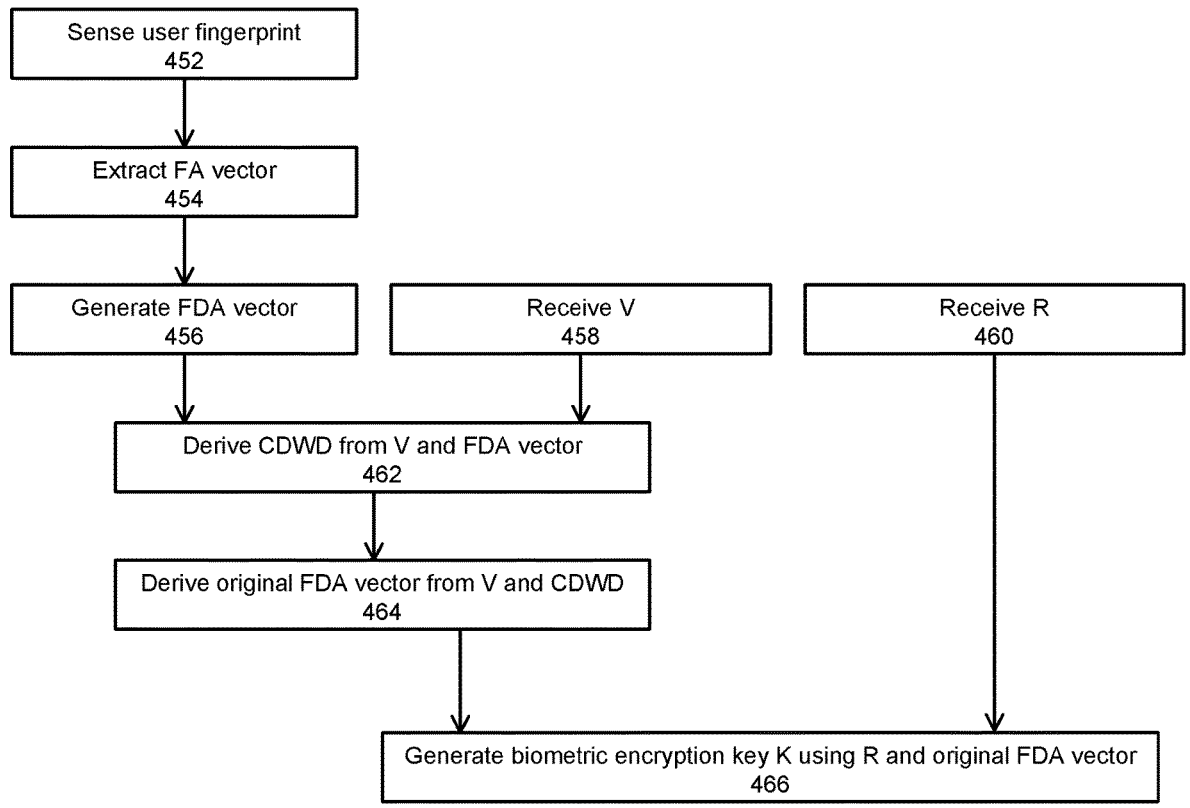
FIG. 4B illustrates a process for regenerating a biometric encryption key, according to an embodiment.

FIG. 4B illustrates a process 450 for regenerating a biometric key with a high probability of success during an authentication process, according to an embodiment. Process 450 may be performed by software and/or hardware of a terminal 150. While process 450 will be described with respect to a user's fingerprint, it should be understood that the same process may be applied to other biometric data, such as a user's iris, face, and/or the like.

In step 452 the user's fingerprint is sensed, with the result being an image of at least one of the user's fingerprints. Step 452 may be similar or identical to step 402 in process 400, but is performed during an authentication process (e.g., by terminal 150), rather than during an enrollment process.

In step 454, a multi-dimensional fingerprint attribute (FA) is extracted from each image of the user's fingerprint. Step 454 may be similar or identical to step 404 in process 400, but is performed during an authentication process (e.g., by terminal 150), rather than during an enrollment process.

In step 456, the multi-dimensional FA is digitized into a fingerprint digital attribute (FDA). Step 456 may be similar or identical to step 406 in process 400, but is performed during an authentication process (e.g., by terminal 150), rather than during an enrollment process. Notably, the FDA vector, generated during the authentication process for a user in step 456, is unlikely to exactly match the FDA vector, generated during the enrollment process for that user in step 406, since the images sensed in steps 402 and 452, from which the FDA vectors are derived, are unlikely to be exactly identical. Specifically, the FDA vector $FDA_2$, generated in step 456, will represent the FDA vector $FDA_1$, generated in step 406, with the addition of some unknown error vector. In other words, $FDA_2=FDA_1+E$, wherein E represents the unknown error vector, and the "+" operator represents modulo-2 addition.

In step 458, a vector V for a user is received, and, in step 460, a random vector R for a user is received. It should be understood that steps 458 and 460 may consist of a single step, in which the auxiliary data (V, R) for a user is received together. For example, the auxiliary data (V, R) may be received in a message from a service-specific interface 130 (e.g., relayed through a region-specific interface 120) during the authentication process. It should be understood that the auxiliary data (V, R) received in steps 458-460, during the authentication process for a user, is the same auxiliary data (V, R) that was stored in step 416, during the enrollment process for that user.

In step 462, the code word CDWD is derived using the vector V, received in step 458, and the FDA vector, generated in step 456. For instance, since $V=FDA_1+CDWD$, $FDA_2+V=FDA_1+E+FDA_1+CDWD=CDWD+E$, wherein the "+" operator again represents modulo-2 addition. Since, code word CDWD was selected from a code book of an FEC scheme, in step 408, the code word CDWD can be derived with a high probability of success from CDWD+E using an FEC decoder.

In step 464, assuming that the code word CDWD is successfully derived in step 462, the original FDA vector $FDA_1$, generated in step 406 during the user's enrollment process, is derived. For example, the code word CDWD, output by the FEC decoder in step 462, may be combined with the vector V, received in step 458, to produce the original FDA vector $FDA_1$. In other words, $CDWD+V=CDWD+FDA_1+CDWD=FDA_1$, wherein the "+" operator again represents modulo-2 addition.

In step 466, the biometric encryption key for the user is generated using the random vector R, received in step 460, and the original FDA vector $FDA_1$, derived in step 464. Step 466 may be similar or identical to step 414 in process 400, but is performed during an authentication process (e.g., by terminal 150), rather than during an enrollment process. In other words, step 466 utilizes the same key generation process that was used in step 414. Since the inputs (i.e., the FDA vector and random vector R) in step 466 should be the same as the inputs in step 414, the key generation process should produce the same biometric encryption key in step 466 as in step 414. Thus, process 450 can be used during a user's authentication process to essentially reverse engineer the user's biometric encryption key generated in step 414 of process 400 during the user's enrollment process.

2.3. Two-Level Token-Less Authentication 2.3.1. First-Level Authentication

Figure 5:
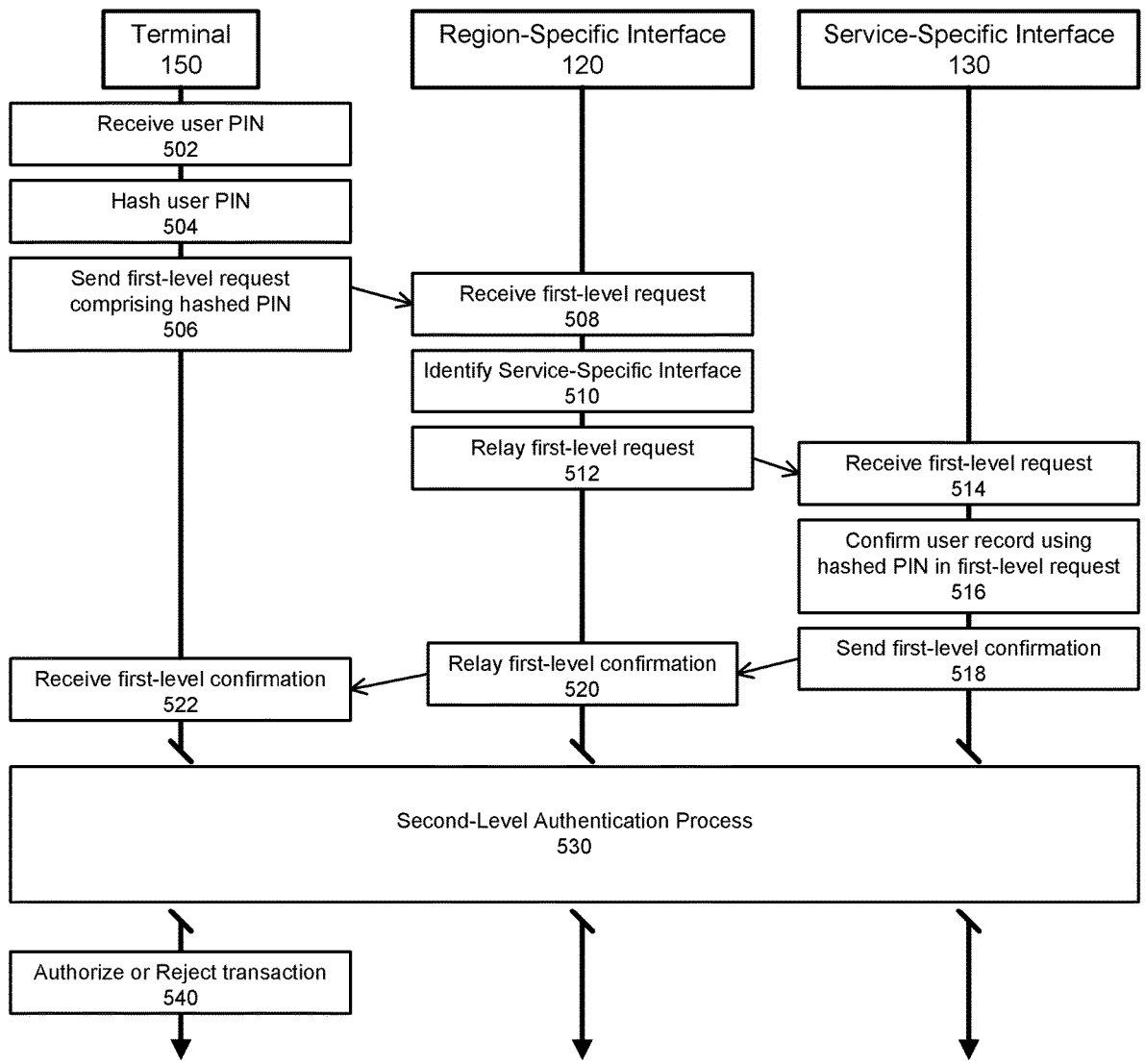
FIG. 5 illustrates a two-level token-less authentication process, according to an embodiment.

FIG. 5 illustrates a two-level token-less authentication process 500, according to an embodiment. Each step may be performed by software and/or hardware of the respective terminal or interface depicted as performing that step.

Process 500 may be used to authenticate a user for a transaction at terminal 150. For example, the transaction may be a purchase transaction at a POS terminal within a merchant's brick-and-mortar store, a cash withdrawal at an ATM terminal associated with a bank, and/or the like.

In step 502, terminal 150 receives the user's PIN from the user. For example, terminal 150 may comprise a physical keypad by which the user may input a sequence of characters constituting the user's PIN. Alternatively or additionally, terminal 150 may comprise a touch-panel display, and a processor 210 which displays a virtual keypad on the touch-panel display, by which the user may input the sequence of characters constituting the user's PIN via touch operations. In an embodiment, the sequence of characters, constituting users' PINs may consist of alphanumeric characters. Alternatively, the sequence of characters may consist of only numeric characters or only alphabetic characters.

In step 504, the user's PIN, received in step 502, is hashed. In an embodiment, hashing the user's PIN consists of hashing only a portion of the user's PIN (e.g., portion(s) of the user's PIN comprising confidential data). Using PIN structure 300 as an example, when the user inputs his or her PIN, sub-PIN field 340 may be extracted, a hash function may be performed on the extracted sub-PIN field 340, and the resulting hash value may be appended to the combination of unhashed region field 310, unhashed entity field 320, and unhashed user field 330, to generate the hashed PIN. Alternatively, a different set of fields or additional fields (e.g., user field 330, all fields, etc.) may be hashed in a similar manner to generate the hashed PIN. In other words, at least a portion—and preferably all fields containing confidential data—of the user's PIN is hashed. However, it should be understood that in embodiments in which security is not as much of a concern, step 504 could be omitted such that the user's PIN is not hashed at all. As an alternative, the PIN or a portion of the PIN may be encrypted in some other manner prior to transmission.

Regardless of how the user's PIN is hashed, not hashed, or encrypted, the resulting PIN is sent in step 506 to the appropriate region-specific interface 120 (e.g., via network 110). For example, terminal 150 may generate a first-level authentication request, comprising the hashed PIN, and may either send the first-level request directly to the appropriate region-specific interface 120, or indirectly by sending the first-level request to the region-specific interface 120 for the region in which terminal 150 is located to be relayed to the appropriate region-specific interface 120. In an embodiment, terminal 150 may be initially disconnected from network 110 when receiving and/or hashing the user's PIN, and may connect to network 110 to send the first-level request.

In an embodiment in which terminal 150 comprises or otherwise utilizes one or more cameras, when the user is inputting his or her PIN, terminal 150 may use the camera(s) to capture one or more images of the user (e.g., still image(s), video comprising a plurality of image frames, etc.). In such an embodiment, the first-level request may also comprise image data, comprising the captured image(s) and/or data derived from the captured image(s) (e.g., feature vector(s) extracted from the captured image(s)), in addition to the hashed PIN.

In an embodiment, terminal 150 sends all authentication requests to the region-specific interface 120 for the region in which the terminal 150 is located. In other words, terminal 150 will always send the first-level request, comprising the hashed PIN, to the same region-specific interface 120, regardless of the value of region field 310. That region-specific interface 120 may receive the hashed PIN and read region field 310, which is preferably not hashed and which identifies the region (e.g., country) in which the user's account can be found. If the identified region, indicated by region field 310, is the same as the region-specific interface 120, no inter-region relay is required. However, if the identified region is different than the region of the region-specific interface 120, the region-specific interface may identify the address for another region-specific interface 120 associated with that region value (e.g., by retrieving the address from memory or otherwise deriving the address based on the identified region), and relay the first-level request to the other region-specific interface 120. As an example, referring to FIG. 1, if terminal 150A in Region A is seeking authentication for a user's PIN with a region field 310 consisting of the value for Region B, terminal 150A may send a first-level request, comprising the hashed PIN, to interface 120A via network 110D, and interface 120A may read the unhashed region field 310, match the value of region field 310 to interface 120B, and therefore, relay the first-level request to interface 120B via network 110C.

In an alternative embodiment, terminal 150 could send the first-level request directly to the appropriate region-specific interface 120. In this case, terminal 150 may determine the appropriate region based on the user's PIN. For example, terminal 150 may read region field 310, which identifies the region (e.g., country) in which the user's account can be found, and identify the address for a particular region-specific interface 120 associated with the region value in region field 310 (e.g., by retrieving the address from memory or otherwise deriving the address based on the identified region). Terminal 150 may then send the first-level request, comprising the hashed PIN, directly to the identified address for the appropriate region-specific interface 120. As an example, referring to FIG. 1, if terminal 150A in Region A is seeking authentication for a user's PIN with a region field 310 consisting of the value for Region B, terminal 150A may send a first-level request, comprising the hashed PIN, directly to interface 120B via network 110. However, it should be understood that this alternative embodiment may diminish security and performance, since, for practical purposes, terminal 150A would likely communicate with interface 120B via the Internet, thereby increasing the span of Internet communications (which are generally less secure).

In step 508, the region-specific interface 120, for the region identified in region field 310 of the user's PIN, receives the first-level request, comprising the hashed PIN (and, in an embodiment, other data, such as image data of the user captured at terminal 150). As discussed above, the first-level request may be received indirectly from terminal 150 via relay through another region-specific interface 120, or, alternatively, may be received directly from terminal 150.

In step 510, region-specific interface 120 determines the appropriate service to be used based on the user's PIN. Using PIN structure 300 as an example, region-specific interface 120 may read service field 320, which is preferably not hashed and which identifies the service that is managing the user's account, and identify the address for a particular service-specific interface 130 associated with the value in service field 320.

In step 512, region-specific interface 120 forwards (e.g., via network 110) the hashed PIN, received in step 508, to the service-specific interface 130 identified in step 510. Step 512 may comprise relaying the first-level request, comprising the hashed PIN (and, in an embodiment, other data, such as image data of the user captured at terminal 150) and received from terminal 150, to the identified service-specific interface 130. Alternatively, step 512 may comprise altering the first-level request in some manner, prior to sending it to service-specific interface 130.

In step 514, service-specific interface 130 receives the first-level request, comprising the hashed PIN (and, in an embodiment, other data, such as image data of the user captured at terminal 150), from region-specific interface 120, and, in step 516, service-specific interface 130 confirms whether or not a user record exists for the PIN. For example, service-specific interface 130 may attempt to retrieve a user record using the hashed PIN as an index into the plurality of user records accessible to service-specific interface 130. If the Hashed PIN(s) field of a user record comprises the hashed PIN, that user record will be retrieved. In the illustrated example of FIG. 5, it is assumed that service-specific interface 130 identifies and retrieves a matching user record based on the hashed PIN, received in step 514. However, it should be understood that, if no user record is identified or retrievable for the hashed PIN, service-specific interface 130 may respond to region-specific interface 120 with a first-level rejection message indicating that the user cannot be authenticated, and region-specific interface 120 may relay that first-level rejection message to terminal 150 (e.g., to reject a subject transaction at terminal 150, as in step 540). In an embodiment, a user may be permitted a limited number of failed attempts (e.g., three) to complete the first-level authentication before a final rejection.

When a user record exists for the PIN, service-specific interface 130 sends a first-level confirmation in step 518. In an embodiment in which messages are relayed between service-specific interface 130 and terminal 150 by region-specific interface 120, the first-level confirmation is relayed by region-specific interface 120 to terminal 150 in step 520. Otherwise, in an embodiment in which messages are sent directly from service-specific interface 130 to terminal 150, step 520 is omitted. In either case, the first-level confirmation is received by terminal 150 in step 522.

In an embodiment, the first-level confirmation and all subsequent messages sent between service-specific interface 130 and terminal 150 may comprise a user identifier that identifies the user (e.g., the value of the User-Specific Account Number field in the user record retrieved in step 516, other identifying data in the user record retrieved in step 516, etc.) and/or a session identifier that identifies the communication session. This may, for example, enable service-specific interface 130 to more quickly retrieve the user record (i.e., using the user identifier and/or session identifier) in response to future messages received from terminal 150.

Once a first-level confirmation has been received in step 522, terminal 150 may initiate a second-level authentication process 530, comprising one or more second-level authentication attempts. Various implementations of second-level authentication process 530 are illustrated with respect to FIGS. 6A-6D.

In step 540, if second-level authentication process 530 results in a second-level confirmation, terminal 150, in response to the second level confirmation, authorizes the subject transaction at terminal 150 in step 560. Otherwise, if second-level authentication process 530 results in a second-level rejection, terminal 150 rejects the subject transaction in step 560.

As discussed elsewhere herein, the subject transaction may be any type of transaction, including, without limitation, the purchase of a good or service at a merchant's store, the withdrawal of cash, deposit of cash and/or checks, checking of funds, and/or the like at an ATM terminal, and/or the like. It should be understood that the transaction may comprise multiple additional steps. For example, in the event that the transaction is a purchase transaction, the transaction may comprise checking that there are sufficient funds in the user's account at service-specific system 140 to complete the transaction, debiting funds for the transaction from the user's account, and crediting the debited funds to the merchant's account.

In an embodiment, in the event that second-level confirmation is achieved in second-level authentication process 530, service-specific interface 130 may send user information to terminal 150 (e.g., indirectly relayed via region-specific interface 120). The user information may be sent in the same message as the second-level confirmation, described elsewhere herein, or in one or more separate messages. The user information may comprise any information related to the user. For example, the user information may comprise information from the user record, stored at service-specific interface 130, such as the values of the User-Specific Account Number field, Service-specific Account Number field, and/or Additional User Information fields. Terminal 150 may use the user information to authorize the subject transaction in step 540, identify the user, or perform any other action that requires or may benefit from the user information. For example, in the event that terminal 150 is an ATM, the user information (e.g., service-specific account number) may be used to identify the user and facilitate transactions performed by the user at the ATM (e.g., cash withdrawal, cash and/or check deposit, providing the amount of funds within the user's bank account, etc.). For some transactions, there may be no need for further communications between terminal 150 and interfaces 120 and/or 130. However, other transactions (e.g., cash withdrawal) may require further communications (e.g., direct or indirect communications with a service-specific interface 130 to check the amount of funds available in the corresponding service-specific system 140).

2.3.2. Second-Level Authentication Using Biometric Encryption Key

Figure 6A:
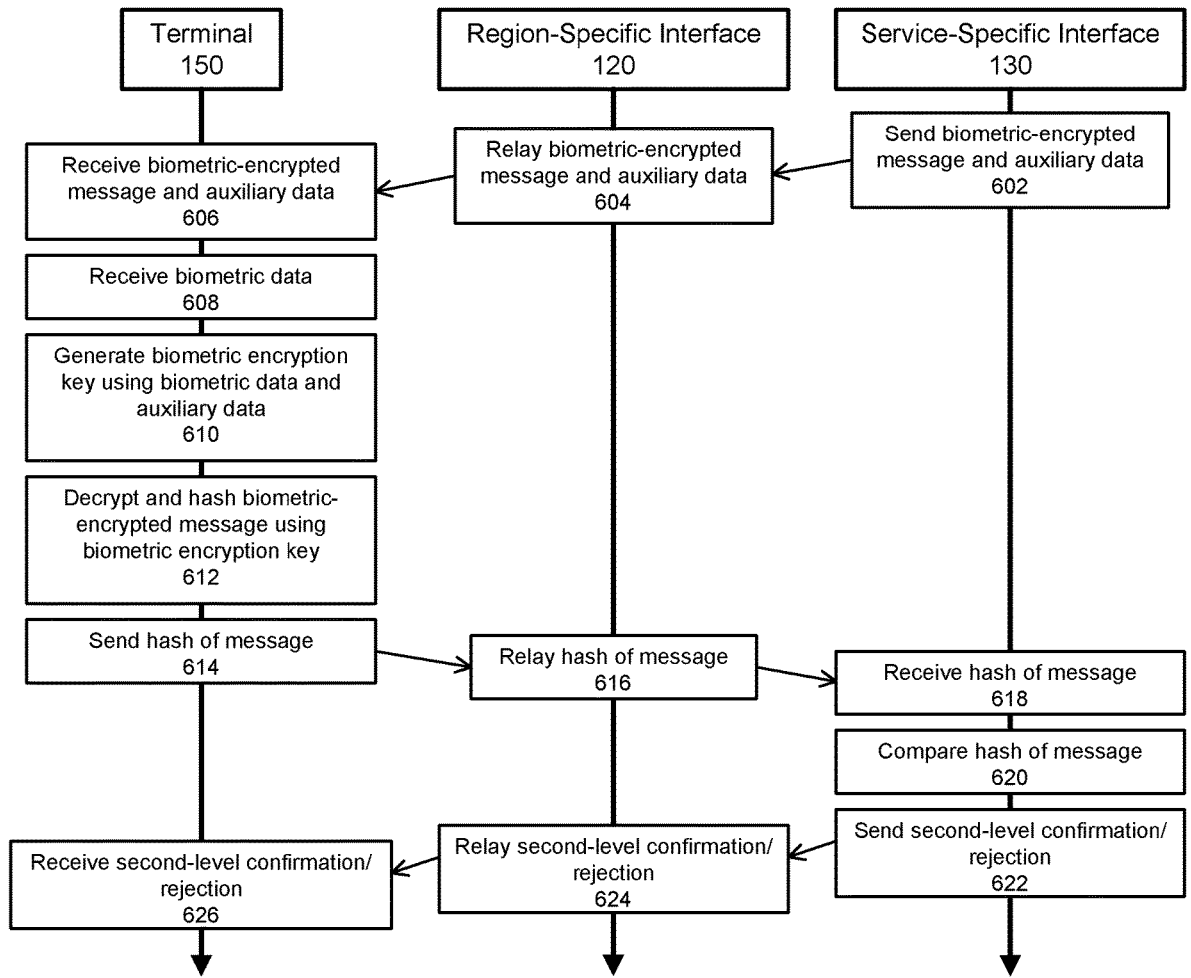
FIGS. 6A-6D illustrate various implementations of the second level in the two-level token-less authentication process in FIG. 5, according to an embodiment.

FIG. 6A illustrates a second-level authentication process 530A that utilizes a biometric encryption key, according to an embodiment. Each step may be performed by software and/or hardware of the respective terminal or interface depicted as performing that step.

In step 602, service-specific interface 130 sends a biometric-encrypted message and auxiliary data to region-specific interface 120. Alternatively, service-specific interface 130 could send the biometric-encrypted message and/or auxiliary information directly to terminal 150. The biometric-encrypted message and/or auxiliary data may be sent in the same message or in separate messages, and can be sent in the same message as the first-level confirmation in step 518 or in separate message(s).

In an embodiment, the biometric-encrypted message comprises a message that has been encrypted using the biometric encryption key for the user being authenticated. Specifically, the biometric-encrypted message may comprise the message, stored in the Stored Message field of the user's user record, encrypted by the key, stored in the Biometric Encryption Key field in the user's user record. For example, if the first-level of authentication is confirmed in step 516, the Stored Message and Biometric Encryption Key fields are read from the retrieved user record, and the message is encrypted by the biometric encryption key K for the user to generate the biometric-encrypted message sent in step 602. In addition, if the first level of authentication is confirmed in step 516, the Auxiliary Non-Sensitive Key Data field is read from the retrieved user record, to obtain the auxiliary data (V, R) described elsewhere herein, and sent in step 602.

In an embodiment in which messages are relayed between service-specific interface 130 and terminal 150 by region-specific interface 120, biometric-encrypted message and auxiliary data are relayed by region-specific interface 120 to terminal 150 in step 604. Otherwise, in an embodiment in which messages are sent directly from service-specific interface 130 to terminal 150, step 604 is omitted. In either case, biometric-encrypted message and auxiliary data are received by terminal 150 in step 606. Receipt of the auxiliary data in step 606 may correspond to steps 458 and 460 in process 450 in FIG. 4B. In an embodiment, once terminal 150 receives the first-level confirmation, biometric-encrypted message, and auxiliary data in steps 522 and 606 (which may be implemented as a single step), terminal 150 disconnects from network 110, prior to proceeding to step 608.

In step 608, terminal 150 receives biometric data from the user. In an embodiment, the biometric data are one or more fingerprints of the user. In such an embodiment, step 608 comprises step 452 of process 450 in FIG. 4B, in which the user's fingerprint is sensed to produce an image of the user's fingerprint.

In step 610, terminal 150 generates the biometric encryption key for the user using the biometric data (e.g., image of the user's fingerprint), received in step 608, and the auxiliary data, received in step 608. In an embodiment, step 610 comprises steps 454, 456, 462, 464, and 466 of process 450 in FIG. 4B. In this case, if the correct code word CDWD was derived in step 462, the biometric encryption key, generated in step 610, should be identical to the biometric encryption key K, stored in the Biometric Encryption Key field of the user's record at service-specific interface 130 and used to encrypt the biometric-encrypted message received in step 606.

In step 612, terminal 150 decrypts the biometric-encrypted message, received in step 606, using the biometric encryption key, generated in step 610. If the correct biometric encryption key was generated in step 610, the result of the decryption process will be a restored message that is identical to the message stored in the Stored Message field of the user's record at service-specific interface 130. Terminal 150 then generates a hash of the restored message using the same hash function that is used to hash messages at service-specific interface 130. In an embodiment, for security purposes, the biometric data (e.g., fingerprint image) received in step 608, the biometric encryption key generated in step 610, and the restored message decrypted in step 612 are all permanently deleted from the memory of terminal 150 (e.g., prior to step 614).

In step 614, terminal 150 sends the hash of the restored message to region-specific interface 120, to be relayed to service-specific interface 130 in step 616. Alternatively, terminal 150 may send the hash of the restored message directly to service-specific interface 130. The hash may be sent in association with the user identifier (e.g., received in the first-level confirmation in step 522). In an embodiment, terminal 150 may be disconnected from network 110 while performing steps 608-612, and may reconnect to network 110 to send the hash of the restored message in step 614. This reconnection may occur after the permanent deletion of the biometric data, biometric encryption key, and restored message, discussed above, so that this data is never exposed to the network 110 on terminal 150.

In step 618, service-specific interface 130 receives the hash of the restored message, sent by terminal 150 in step 614. In step 620, service-specific interface 130 then compares the received hash to a hash of the message stored in the user record associated with the user. In an embodiment, step 620 comprises generating a hash of the message in the Stored Message field of the user record using the same hash function used in step 612, and comparing that hash to the hash of the restored message received in step 618. Alternatively, the message stored in the Stored Message field of a user's record, during the enrollment process, may be the hash of the message, rather than the message itself. In this case, step 620 comprises simply comparing that hash in the Stored Message field of the user record to the hash received in step 618.

In the event that the hashes match in step 620, service-specific interface 130 sends a second-level confirmation in step 620. Otherwise, in the event that the hashes do not match in step 620, service-specific interface 130 sends a second-level rejection in step 620. Again, the second-level confirmation or rejection may be relayed, through region-specific interface 120 in step 624, to terminal 150, or may be sent directly from service-specific interface 130 to terminal 150. In any case, terminal 150 receives the second-level confirmation or rejection in step 626.

In an embodiment, upon sending a second-level confirmation or sometime after receiving a confirmation that a transaction has been completed (i.e., subsequent to step 540 if the transaction is authorized), service-specific interface 130 renews the message in the Stored Message field of the user's record. For example, service-specific interface 130 may randomly generate a new message and overwrite the message stored in the Stored Message field of the user record.

It should be understood that, even if the hashes did not match in step 620, the user may still be authentic. For example, the failure to make a match may be due to the error between the original FDA vector generated in step 406, during the enrollment process, and the FDA vector generated in step 456/610, during the authentication process, being too large, which may result in the incorrect code word CDWD being derived in step 462/610. It would be desirable to permit authentication even when this initial second-level authentication fails.

Accordingly, in an embodiment, terminal 150 may prompt the user to present a different finger, and another iteration of process 530A may be performed in an attempt to achieve the second-level confirmation. The probability of two successive false negatives on different fingers of the same user is the square of the probability of a false negative on a single finger, since the two events can be thought of as independent of each other. Thus, two or more iterations of process 530A on different fingers or the same finger(s) of a user can significantly reduce the likelihood of false negatives. When different fingers are used in successive iterations of process 530A, it should be understood that a different biometric encryption key will be used to encrypt the biometric-encrypted message sent in step 602, and that a different biometric encryption key should be generated in step 610.

2.3.3. Second-Level Authentication Using Camera

Figure 6B:
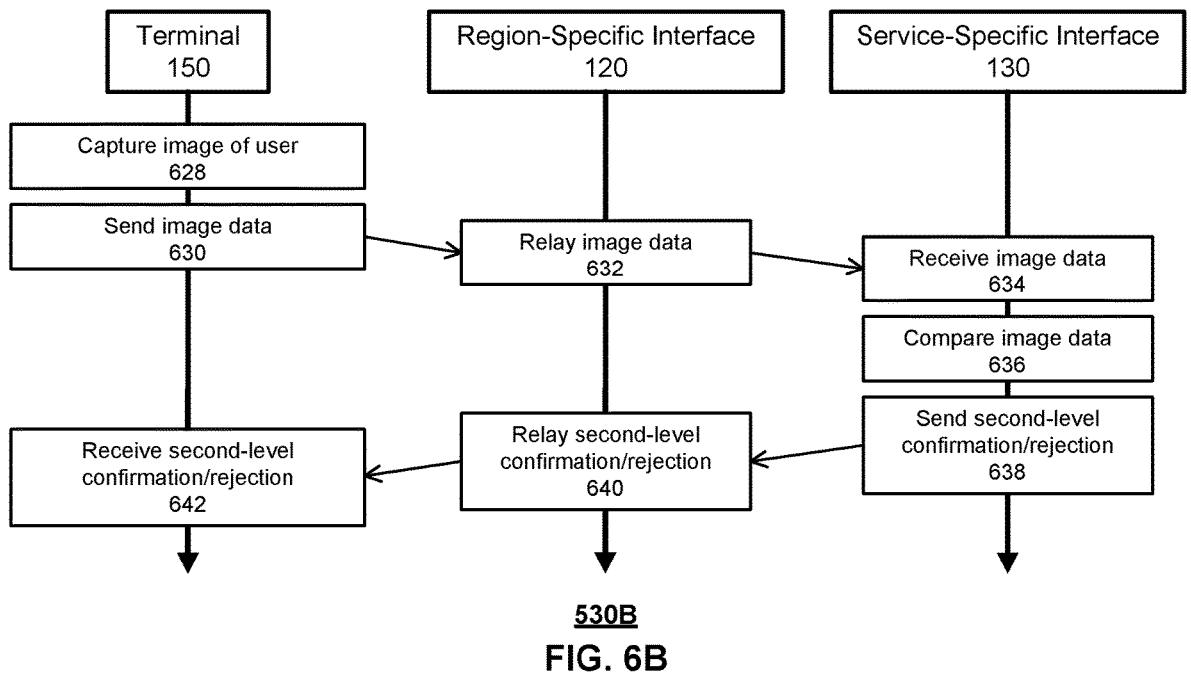

FIG. 6B illustrates a second-level authentication process 530B that utilizes one or more cameras at terminal 150 to perform facial recognition, according to an embodiment. Each step may be performed by software and/or hardware of the respective terminal or interface depicted as performing that step.

Process 530B may be used to authenticate a user for a transaction or other purpose at a terminal 150 that comprises or has access to a camera configured to capture a contemporaneous image of a user of the terminal 150. As an example, terminal 150 may be an ATM, which is equipped with one or more front-facing cameras configured to capture image(s) (e.g., still images, video comprising a plurality of image frames, etc.) of an area in front of the ATM which is necessarily occupied by a user of the ATM.

In step 628, terminal 150 captures one or more images using the camera of terminal 150. As described above, the camera may be a front-facing camera (e.g., high-definition camera) that captures an image (e.g., high-resolution image) of an area in front of an operation region (e.g., touch panel display, hardware keyboard, etc.) of terminal 150. Thus, each of the captured image(s) will comprise an image of the user of terminal 150, who is standing in the area in front of terminal 150 to interact with the operation region.

In step 630, terminal 150 sends the image data of the user to region-specific interface 120, which relays the image data to service-specific interface 130 in step 632. Alternatively, terminal 150 may send the image data directly to service-specific interface 130, without relaying the image data through region-specific interface 120. In either case, service-specific interface 130 receives the image data of the user in step 634. The image data may comprise the image captured in step 628, and/or data (e.g., a feature vector) derived from the image captured in step 628.

In step 636, service-specific interface 130 compares the image data, received in step 634, to previously stored image data of the user. For example, service-specific interface 130 may read the image data from the User Image Data field in the user's record, and compare that image data to the image data received in step 634, using a conventional facial-recognition engine.

If the image data match in step 636, service-specific interface 130 sends a second-level confirmation in step 638. On the other hand, if the image data do not match in step 636, service-specific interface 130 sends a second-level rejection in step 638. The second-level confirmation or rejection may be relayed to terminal 150 through region-specific interface 120, as illustrated in step 640, or may be sent directly to terminal 150. In either case, terminal 150 receives the second-level confirmation or rejection in step 642.

For efficiency, the image data, captured in step 628, may be incorporated into the first-level request (i.e., along with the hashed PIN) sent in step 506. In other words, step 630 may be combined with step 506, step 632 may be combined with step 512, and step 634 may be combined with step 514, in order to reduce the number of messages sent between terminal 150 and service-specific interface 130. Similarly, step 638 could be combined with step 518, step 640 could be combined with step 520, and step 642 could be combined with step 522, such that the first-level and second-level confirmations are transmitted using a single message.

2.3.4. Manual Second-Level Authentication

Figure 6C:
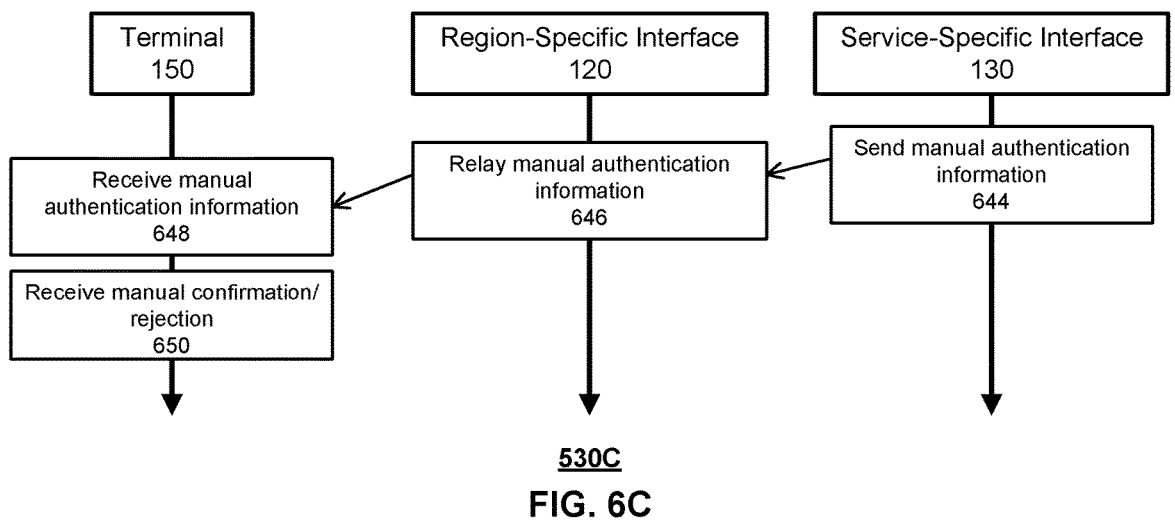

FIG. 6C illustrates a manual second-level authentication process 530C, according to an embodiment. Each step may be performed by software and/or hardware of the respective terminal or interface depicted as performing that step.

In step 644, service-specific interface 130 may send information for enabling manual authentication. This information may be relayed, through region-specific interface 120 in step 646, to terminal 150, or may be sent directly from service-specific interface 130 to terminal 150. In either case, terminal 150 receives the manual authentication information in step 648.

In step 650, the information, received in step 648, is used to perform manual authentication. For example, this information may comprise image data (e.g., photograph or feature vector acquired from a photograph) of the user (e.g., stored in the User Image Data field of the user's record at service-specific interface 130) challenge questions, and/or answers to the challenge questions (e.g., stored in the Users Answers field of the user's record at service-specific interface 130). However, it should be understood that other types of information may be used.

The information for manual authentication may be collected from a user during his or her enrollment process. For example, a photograph of the user may be captured using a camera of the device used for enrollment (e.g., an electronic kiosk, the user's smartphone or computer, etc.). In addition, a graphical user interface of the enrollment device may specify one or more challenge questions in association with inputs via which the user can input his or her own personal answers to the challenge questions. Image data (e.g., the photograph or a feature vector derived from the photograph) and the challenge-question answers may be stored in the User Image Data field and User Answers field, respectively, of the user record generated for the user during the enrollment process and stored at service-specific interface 130.

Step 650 may comprise presenting the information to an operator of terminal 150 within a graphical user interface on a display of terminal 150, and prompting the operator to confirm the user's identity using one or more inputs of the graphical user interface. In the event that terminal 150 is a POS terminal in a merchant's store, the operator may be a cashier at the store. The operator may use the information to confirm the user's identity, and then select or otherwise operate one or more inputs of the graphical user interface, displayed on the display of terminal 150, to either confirm or reject the manual authentication. Alternatively, step 650 may comprise requesting additional information directly from the user, using a graphical user interface, displayed on the display of terminal 150, and using the additional information in combination with the information, received in step 648, to complete the second-level of authentication.

As an example, when the information comprises a photograph of the user, the photograph may be displayed in the graphical user interface of terminal 150, such that the operator can compare the photograph of the user to the actual user. Alternatively, terminal 150 may comprise a camera that captures an image of the user, and terminal 150 may compare the captured image of the user to the image data, received in step 648, using a conventional facial-recognition engine (e.g., by deriving a feature vector from the captured image and comparing the derived feature vector to a feature vector in the image data or derived from the image data received in step 648).

As another example, when the information comprises challenge question(s) and answer(s) to challenge question(s), the challenge question(s) and answer(s) may be displayed in the graphical user interface, of terminal 150 such that the operator may ask the user one or more challenge questions and compare the user's answer(s) to those challenge question(s) to the answer(s) within the graphical user interface. Alternatively, the challenge question(s) may be displayed within the graphical user interface in association with inputs (e.g., textboxes) for answering the challenge question(s), such that the user may input his or her answers to those challenge question(s) directly into the inputs and/or a non-user operator may input the user's answers to the challenge question(s) into the inputs. Terminal 150 may then compare the input answers to the answers, received in step 648, to determine whether or not they match.

Whether manual authentication is performed by an operator at terminal 150 (e.g., by comparing the user's image and/or asking the user for answers to challenge questions) and/or automatically by terminal 150 (e.g., by capturing the user's image and/or receiving the user's answers to challenge questions), the information, received in step 648, will either match or not match the information collected at terminal 150. Assuming the information matches, there has been a manual confirmation of authentication, in which case the subject transaction may be authorized in step 540. On the other hand, if the information does not match, there has been a manual rejection of authentication, in which case the subject transaction may be rejected in step 540.

2.3.5. Manual Second-Level Authentication Using Challenges

Figure 6D:
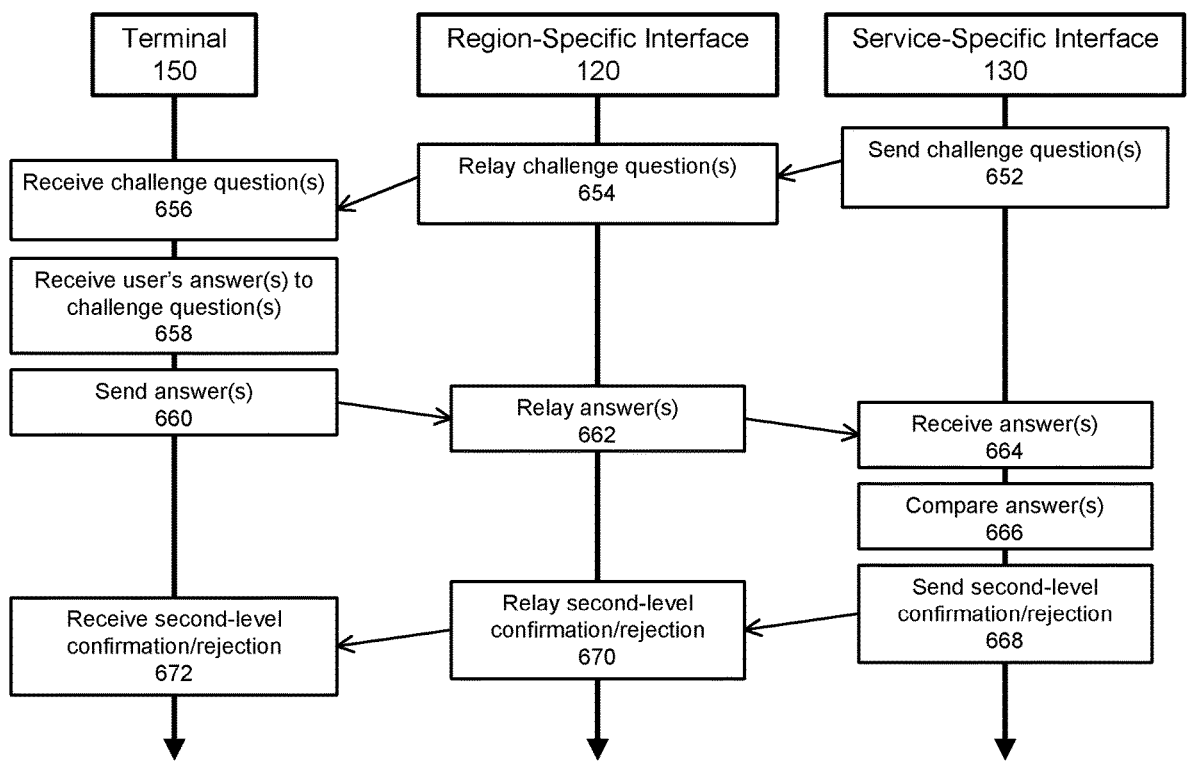

FIG. 6D illustrates a manual second-level authentication process 530D using challenge questions, according to an embodiment. Each step may be performed by software and/or hardware of the respective terminal or interface depicted as performing that step.

In step 652, service-specific interface 130 may send one or more challenge questions, associated with the user, to terminal 150. The challenge question(s) may be relayed, through region-specific interface 120 in step 654, to terminal 150, or may be sent directly from service-specific interface 130 to terminal 150. In either case, terminal 150 receives the challenge question(s) in step 656.

As discussed elsewhere herein, a user's challenge question(s) and answer(s) may be collected from a user during his or her enrollment process. For example, a graphical user interface of the enrollment device may specify one or more challenge questions in association with inputs via which the user can input his or her own personal answer(s) to the challenge question(s). The challenge-question answer(s) may be stored (e.g., in association with the challenge question(s)) in the User Answers field of the user record generated for the user during the enrollment process and stored at service-specific interface 130.

In step 658, the challenge question(s) may be displayed within the graphical user interface of terminal 150 in association with one or more inputs (e.g., textboxes) for answering the challenge question(s). The user may input his or her answer(s) to those challenge question(s) directly into the input(s) and/or the operator may input the user's answer(s) to the challenge question(s) into the input(s).

In step 660, terminal 150 sends the answer(s), input in step 658, to region-specific interface 120, to be relayed to service-specific interface 130 in step 662. Alternatively, terminal 150 may send the answer(s) directly to service-specific interface 130. The answer(s) may be sent in association with the user identifier (e.g., received in the first-level confirmation in step 522). In an embodiment, terminal 150 may be disconnected from network 110 while performing step 658, and may reconnect to network 110 to send the answer(s) in step 660.

In step 664, service-specific interface 130 receives the answer(s), input in step 658, and, in step 666, compares the input answer(s) to the answer(s) stored in the User Answers field of the user's record at service-specific interface 130. In the event that the answers match, service-specific interface 130 sends a second-level confirmation in step 668. Otherwise, in the event that the answers do not match, service-specific interface 130 sends a second-level rejection in step 668. The second-level confirmation or rejection may be relayed, through region-specific interface 120 in step 670, to terminal 150, or may be sent directly from service-specific interface 130 to terminal 150. In any case, terminal 150 receives the second-level confirmation or rejection in step 672.

2.3.6. Combinations of Second-Level Authentication Processes

Second-level authentication process 530 may comprise a plurality of processes 530A-530D and/or a plurality of iterations of one of processes 530A-530D. In the event that process 530 comprises two or more of processes 530A-530D, each of those processes may be independently capable of confirming the second-level authentication. Alternatively, all or a certain subset of the processes may be required to result in a match before confirmation of the second-level authentication.

As a first example, as discussed above, process 530 may comprise multiple iterations of process 530A for different biometric data of the user, until the second-level authentication is confirmed and/or until a maximum number of iterations (e.g., three) are reached. As a non-limiting example, in an initial iteration, the biometric data used (i.e., received in step 608 and from which the biometric encryption key is generated in step 610) may be for a first finger of the user, and, if that fails to produce a second-level confirmation, in a subsequent iteration, the biometric data used may be for a second, different finger of the user. As another non-limiting example, in an initial iteration, the biometric data used may be for a finger of the user, and, if that fails to produce a second-level confirmation, in a subsequent iteration, the biometric data used may be for an iris of the user. It should be understood that, if the maximum number of iterations are reached without a second-level confirmation, the result may be a second-level rejection.

As a second example, process 530 may comprise at least one iteration of process 530A in combination with an iteration of process 530B. Assuming that a successful match by either process 530A or 530B is sufficient, the second-level confirmation may be achieved via either a fingerprint match (i.e., via a matching hash in step 620) or a facial match (i.e., via matching image data in step 636). In an embodiment, process 530B may be performed in parallel with process 530A. In this case, assuming that only one process needs to be successful, terminal 150 may authorize the transaction in step 540 as soon as a second-level confirmation is received from one of the processes 530A or 530B (i.e., whether in step 626 or 642). Alternatively, assuming that both processes need to be successful, terminal 150 may authorize the transaction in step 540 as soon as a second-level confirmation is received from both processes 530A and 530B (i.e., upon the occurrence of both steps 626 and 642). As yet another alternative, step 622 may be combined with step 638, step 624 may be combined with step 640, and step 626 may be combined with step 642, such that service-specific interface 130 determines whether or not the results of processes 530A and 530B are sufficient for a second-level authentication, and issues that confirmation or rejection in a single message to terminal 150.

As a third example, process 530 may comprise an automatic second-level authentication process (e.g., iteration(s) of process 530A and/or process 530B) in combination with a manual second-level authentication process (e.g., iteration(s) of process 530C and/or process 530D). In this case, process 530 may attempt to automatically achieve a second-level confirmation via process 530A and/or 530B, and, only in the event that the automatic process(es) fail, subsequently attempt to manually achieve a second-level confirmation via process 530C and/or 530D. In other words, even though the automatic authentication process(es) result in a technical rejection, this technical rejection may be overcome by the manual authentication process(es). For efficiency, the manual authentication information (e.g., sent in step 644) and/or challenge questions (e.g., sent in step 652), for the manual authentication process(es), may be sent in the same message as the second-level rejection (e.g., sent in step 622 or 638) for the automatic authentication process (es), or may be sent in separate message(s) than the second-level rejection.

It should be understood that these are only a few, non-limiting examples of how processes 530A-530D may be mixed and matched. Other combinations of processes 530A-530D are possible and contemplated by the present disclosure.

2.3.7. Manual Override

In an embodiment, if terminal 150 is manned by an operator who is not the user (e.g., a cashier), two-level authentication process 500 may be overridden at any time by the operator. For example, the operator may manually authenticate a user and/or authorize the subject transaction, despite one or more rejections in second-level authentication process 530. Conversely, the operator may manually reject authentication of the user and/or reject the subject transaction, despite a confirmation in second-level authentication process 530.

To this end, in an embodiment, a photograph of the user is always provided by service-specific interface 130 to terminal 150 (e.g., in the first-level confirmation sent by service-specific interface 130 in step 518 and received by terminal 150 in step 522, in the second-level confirmation sent by service-specific interface 130 in step 622 or 638 and received by terminal 150 in step 626 or 642, in the manual authentication information sent by service-specific interface 130 in step 644 and received by terminal 150 in step 648, or in any other message). The photograph of the user may be displayed in the graphical user interface of terminal 150, such that the non-user operator of terminal 150 may compare the photograph of the user to the actual user. While a photograph is used as an example, it should be understood that other information about the user may additionally or alternatively be provided to the operator for comparison (e.g., the user's name, date of birth, etc.).

In an embodiment, the graphical user interface of terminal 150 comprises one or more inputs by which the non-user operator may override a technical confirmation (i.e., automatic second-level authentication) and/or a technical rejection (i.e., no automatic second-level authentication). The operator may operate these input(s) to thereby override any result or certain results of two-level authentication process 500.

In the event of a technical rejection, the operator may be required to perform his or her own authentication to override the technical rejection (i.e., turn the technical rejection into a manual confirmation). For example, the operator may perform his or her own authentication by providing his or her own fingerprint and/or PIN to terminal 150. Terminal 150 may compare the fingerprint and/or PIN to a fingerprint and/or PIN stored for the operator to either confirm or reject the operator's authentication. In the event that the operator is authenticated, the graphical user interface of terminal 150 may provide an input by which the operator can manually authenticate the user (e.g., if the photograph of the user matches the actual user).

Similarly, in the event of a technical confirmation, the graphical user interface of terminal 150 may comprise an input by which the operator can manually reject authentication of the user (e.g., if the photograph of the user does not match the actual user). This input may be provided regardless of whether or not the operator has been authenticated, or may only be provided after the operator has been authenticated. In any case, the input may allow the operator to override a technical confirmation of the user (i.e., turn the technical confirmation into a manual rejection), to thereby prevent a transaction which the operator believes may be fraudulent despite the technical confirmation.

2.4. Communications

All communications between terminal 150 and region-specific interface 120, between distinct region-specific interfaces 120, and/or between a region-specific interface 120 and service-specific interface 130 should utilize encryption. However, for additional security, these communications may also utilize encrypted tunnels (e.g., SSH tunneling) to send messages. Advantageously, encrypted tunnels hide the nature of traffic (e.g., original sources and final destinations of messages) passing within the tunnels.

In addition, it should be understood that each message, sent between service-specific interface 130 and terminal 150 (whether or not relayed through one or more region-specific interfaces 120), may comprise a session or transaction identifier. This enables the recipient of each message to relate each received message to other messages within the same session or related to a particular transaction, as well as information stored or accumulated for the session or transaction.

As specifically mentioned in some cases described herein, in an embodiment, each terminal 150 may remain offline (i.e., disconnected from network 110) as long as it is not sending or waiting to receive any messages. Thus, for example, a terminal 150 may remain offline until immediately before it needs to send a message to an interface 120 or 130, may go online (i.e., connected to network 110) to send the message, and may go offline again immediately after receiving a response to the message from the interface (assuming that terminal 150 is not expecting further messages). This reduces the possibility that terminal 150 may be compromised via network 110.

As discussed throughout the present disclosure, in an embodiment, all communications between a terminal 150 and a service-specific interface 130 may be relayed through one or more region-specific interface(s) 120. Advantageously, in such an embodiment, terminal 150 does not need to know details about the service-specific interfaces 130.

In cases in which the service-specific interface 130 is within the same region as the terminal 150, the communications will be relayed through a single region-specific interface 120. For example, referring to FIG. 1, communications between terminal 150A and service-specific interface 130M are relayed through region-specific interface 120A.

In an embodiment, in cases in which the service-specific interface 130 is not within the same region as the terminal 150, the communications are relayed through two region-specific interfaces 120. Thus, in this scenario, it should be understood that the region-specific interface 120, depicted in FIGS. 5-6D, may represent the second region-specific interface 120 (i.e., within the region associated with service-specific interface 130), and that the first region-specific interface 120 (i.e., within the region associated with terminal 150) is not shown in FIGS. 5-6D, but would be situated between terminal 150 and the second region-specific interface 120 within these figures to relay messages between terminal 150 and the second region-specific interface 120. Advantageously, in such an embodiment, terminal 150 does not need to know details about different region-specific interfaces 120. Rather, terminal 150 only needs to know how to communicate with the region-specific interface 120 for the terminal's own region. For example, again referring to FIG. 1, communications between terminal 150A and service-specific interface 130X are relayed through region-specific interface 120A and region-specific interface 120B. Specifically, region-specific interface 120A relays messages from terminal 150A to region-specific interface 120B via network 110C (e.g., a tier-one global data network), and region-specific interface 120B relays the messages to service-specific interface 130X via network 110B (e.g., a regional data network). In the other direction, region-specific interface 120B relays messages from service-specific interface 130X to region-specific interface 120A via network 110C, and region-specific interface 120A relays the messages to terminal 150A via network 110D (e.g., the Internet). In this case, terminal 150A only needs to know how to communicate with region-specific interface 120A, and does not need to know anything about region-specific interface 120B. Essentially, terminal(s) 150 are forced to always perform the authentication process through the region-specific interface 130 for their particular region.

In an embodiment, each region-specific interface 120 (e.g., region-specific interface 120A) communicates with other region-specific interfaces 120 (e.g., region-specific interface 120B) using, for example, Multiprotocol Label Switching (MPLS) to provide a high-performance telecommunications link over network 110C (e.g., a tier-one global data network) between the two region-specific interfaces 120. For this purpose, each region-specific interface 120 may maintain a look-up table, in memory, that maps region codes (e.g., provided in region field 310 of PIN structure 300) to the MPLS link to the region-specific interface 120 for the region associated with that region code. Thus, by reading the region field 310 of a PIN (e.g., received in step 508), any region-specific interface 120 can quickly identify the appropriate MPLS link to be used for the authentication process.

Similarly, in an embodiment, each region-specific interface 120 (e.g., region-specific interface 120A) communicates with entity-specific interfaces 130 (e.g., entity-specific interfaces 130M and 130N) using, for example, a dedicated data link provided through network 110A (e.g., a data network for Region A). For this purpose, each region-specific interface 120 may maintain a look-up table, in memory, that maps service identifiers (e.g., provided in service field 320 of PIN structure 300) to the dedicated data link to the service-specific interface 130 for the service associated with that service identifier. Thus, by reading the service field 320 of a PIN (e.g., received in step 508), any region-specific interface 120 can quickly identify the appropriate dedicated data link to be used for the authentication process.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method comprising:
by at least one hardware processor of a region-specific interface,
via at least one first network, receiving a partially-hashed personal identification number (PIN) from a terminal, wherein the partially-hashed PIN comprises an unhashed first portion that identifies a service-specific interface associated with the user account, and a hashed second portion,
via at least one second network, relaying the partially-hashed PIN to the service-specific interface identified by the first unhashed portion of the partially-hashed PIN,
via the at least one second network, receiving a first-level confirmation or rejection from the service-specific interface, and,
via the at least one first network, relaying the first-level confirmation or rejection to the terminal; and,
by the at least one hardware processor of the service-specific interface, when the first-level confirmation or rejection is a first-level confirmation,
via the at least one second network, receiving a request for second-level confirmation, comprising image data of the user, from the region-specific interface,
comparing the image data of the user in the request for second-level confirmation to image data of the user stored by the service-specific interface,
when the image data of the user in the request for second-level confirmation matches the image data of the user stored by the service-specific interface, sending a second-level confirmation and user information associated with the user; and,
when the image data of the user in the request for second-level confirmation does not match the image data of the user stored by the service-specific interface, sending a second-level rejection.

2. The method of claim 1, wherein the partially-hashed PIN further comprises an unhashed third portion that identifies a geographical region associated with the user account.

3. The method of claim 1, further comprising, by at least one hardware processor of the terminal:
receiving a PIN from a user via one or more inputs of the terminal;
using a hash function to hash a portion of the PIN to generate the partially-hashed PIN; and,
via the at least one first network, sending the partially-hashed PIN to the region-specific interface.

4. The method of claim 3, wherein the PIN is unique to the user among all other users.

5. The method of claim 3, wherein the PIN comprises a portion derived from the user's name.

6. The method of claim 1, further comprising, by at least one hardware processor of the service-specific interface:
   via the at least one second network, receiving the partially-hashed PIN from the region-specific interface;
   determining whether or not a user record exists for the partially-hashed PIN;
   when a user record is determined to exist for the partially-hashed PIN, via the at least one second network, sending a first-level confirmation to the region-specific interface; and,
   when a user record is not determined to exist for the partially-hashed PIN, via the at least one second network, sending a first-level rejection to the region-specific interface.

7. The method of claim 1, further comprising, by the at least one hardware processor of the region-specific interface, when the first-level confirmation or rejection is a first-level confirmation:
   via the at least one first network, receiving the request for second-level confirmation from the terminal;
   via the at least one second network, relaying the request for second-level confirmation to the service-specific interface;
   via the at least one second network, receiving the second-level confirmation or rejection from the service-specific interface; and,
   via the at least one first network, relaying the second-level confirmation or rejection to the terminal.

8. The method of claim 7, further comprising, by the at least one hardware processor of the terminal:
   via the at least one first network, receiving the second-level confirmation or rejection from the region-specific interface;
   when the second-level confirmation is received and no manual override is received from an operator of the terminal, authorizing a transaction at the terminal;
   when the second-level confirmation is received and the manual override is received from the operator of the terminal, rejecting the transaction at the terminal;
   when the second-level rejection is received and no manual override is received from the operator of the terminal, rejecting the transaction at the terminal; and,
   when the second-level rejection is received and the manual override is received from the operator of the terminal, authorizing the transaction at the terminal.

9. The method of claim 1, wherein the at least one first network and the at least one second network are the same network.

10. A system comprising:
    at least one hardware processor of a region-specific interface;
    one or more software modules, stored in a memory of the region-specific interface, that, when executed by the at least one hardware processor of the region-specific interface,
    via at least one first network, receive a partially-hashed personal identification number (PIN) from a terminal, wherein the partially-hashed PIN comprises an unhashed first portion that identifies a service-specific interface associated with the user account, and a hashed second portion,
    via at least one second network, relay the partially-hashed PIN to the service-specific interface identified by the first unhashed portion of the partially-hashed PIN,
    via the at least one second network, receive a first-level confirmation or rejection from the service-specific interface, and, via the at least one first network, relay the first-level confirmation or rejection to the terminal;
    at least one hardware processor of the service-specific interface; and
    one or more software modules, stored in a memory of the service-specific interface, that, when executed by the at least one hardware processor of the service-specific interface, when the first-level confirmation or rejection is a first-level confirmation,
       via the at least one second network, receive a request for second-level confirmation, comprising image data of the user, from the region-specific interface,
       compare the image data of the user in the request for second-level confirmation to image data of the user stored by the service-specific interface,
       when the image data of the user in the request for second-level confirmation matches the image data of the user stored by the service-specific interface, send a second-level confirmation and user information associated with the user; and,
       when the image data of the user in the request for second-level confirmation does not match the image data of the user stored by the service-specific interface, send a second-level rejection.

11. Non-transitory computer-readable media comprising:
    a first non-transitory computer-readable medium having first instructions stored therein, wherein the first instructions, when executed by a processor of a region-specific interface, cause the processor to
       via at least one first network, receive a partially-hashed personal identification number (PIN) from a terminal, wherein the partially-hashed PIN comprises an unhashed first portion that identifies a service-specific interface associated with the user account, and a hashed second portion,
       via at least one second network, relay the partially-hashed PIN to the service-specific interface identified by the first unhashed portion of the partially-hashed PIN
       via the at least one second network, receive a first-level confirmation or rejection from the service-specific interface, and,
    via the at least one first network, relay the first-level confirmation or rejection to the terminal; and
    a second non-transitory computer-readable medium having second instructions stored therein, wherein the second instructions, when executed by a processor of a service-specific interface, cause the processor to, when the first-level confirmation or rejection is a first-level confirmation,
       via the at least one second network, receive a request for second-level confirmation, comprising image data of the user, from the region-specific interface,
       compare the image data of the user in the request for second-level confirmation to image data of the user stored by the service-specific interface,
       when the image data of the user in the request for second-level confirmation matches the image data of the user stored by the service-specific interface, send a second-level confirmation and user information associated with the user; and, when the image data of the user in the request for second-level confirmation does not match the image data of the user stored by the service-specific interface, send a second-level rejection.

12. A method comprising:

by at least one hardware processor of a region-specific interface, via at least one first network, receiving a partially-hashed personal identification number (PIN) from a terminal, wherein the partially-hashed PIN comprises an unhashed first portion that identifies a service-specific interface associated with the user account, and a hashed second portion, via at least one second network, relaying the partially-hashed PIN to the service-specific interface identified by the first unhashed portion of the partially-hashed PIN, via the at least one second network, receiving a first-level confirmation or rejection from the service-specific interface, and, via the at least one first network, relaying the first-level confirmation or rejection to the terminal; and, by the at least one hardware processor of the terminal, via the at least one first network, receiving a second-level confirmation or rejection from the region-specific interface, when the second-level confirmation is received and no manual override is received from an operator of the terminal, authorizing a transaction at the terminal, when the second-level confirmation is received and the manual override is received from the operator of the terminal, rejecting the transaction at the terminal, when the second-level rejection is received and no manual override is received from the operator of the terminal, rejecting the transaction at the terminal, and, when the second-level rejection is received and the manual override is received from the operator of the terminal, authorizing the transaction at the terminal.

* * * * *